(12) United States Patent
Sato et al.

(10) Patent No.: US 6,660,069 B2
(45) Date of Patent: Dec. 9, 2003

(54) HYDROGEN EXTRACTION UNIT

(75) Inventors: Hiromichi Sato, Atsugi (JP); Satoshi Iguchi, Mishima (JP); Satoshi Aoyama, Susono (JP); Naoki Ito, Yokohama (JP); Toshihide Nakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/197,863

(22) Filed: Jul. 19, 2002

(65) Prior Publication Data

US 2003/0015096 A1 Jan. 23, 2003

(30) Foreign Application Priority Data

Jul. 23, 2001 (JP) .................................. 2001-222079
Sep. 19, 2001 (JP) .................................. 2001-284437

(51) Int. Cl.⁷ ............................................. B01D 53/22
(52) U.S. Cl. .................... 96/4; 95/56; 96/9; 96/11; 55/DIG. 5; 210/321.75; 210/321.84
(58) Field of Search .................... 95/55, 56; 96/4, 96/7, 9, 11; 55/524, DIG. 5; 210/321.75, 321.84

(56) References Cited

U.S. PATENT DOCUMENTS

| | | | | |
|---|---|---|---|---|
| 2,824,620 A | * | 2/1958 | De Rosset | 95/56 |
| 3,447,288 A | * | 6/1969 | Juda et al. | 96/11 |
| 4,810,485 A | * | 3/1989 | Marianowski et al. | 423/648.1 |
| 5,225,080 A | * | 7/1993 | Karbachsch et al. | 210/321.75 |
| 5,393,325 A | * | 2/1995 | Edlund | 95/56 |
| 5,645,626 A | | 7/1997 | Edlund et al. | |
| 5,782,960 A | * | 7/1998 | Ogawa et al. | 96/11 |
| 5,904,754 A | * | 5/1999 | Juda et al. | 96/11 |
| 5,997,594 A | | 12/1999 | Edlund et al. | |
| 6,171,574 B1 | * | 1/2001 | Juda et al. | 423/648.1 |
| 6,319,306 B1 | * | 11/2001 | Edlund et al. | 96/7 |

FOREIGN PATENT DOCUMENTS

| | | |
|---|---|---|
| EP | 0 796 647 A1 | 9/1997 |
| JP | A 6-345408 | 12/1994 |
| JP | A 11-276866 | 10/1999 |
| WO | WO 00/27507 A1 * | 5/2000 |
| WO | WO 00/31816 | 6/2000 |
| WO | WO 01/28662 A1 * | 4/2001 |
| WO | WO 01/70376 A1 | 9/2001 |
| WO | WO 01/83086 A1 * | 11/2001 |

* cited by examiner

Primary Examiner—Robert H. Spitzer
(74) Attorney, Agent, or Firm—Oliff & Berridge, PLC

(57) ABSTRACT

A hydrogen extraction unit has reformed gas flow channel plates, hydrogen separation plates, and purge gas flow channel plates, which are designed as thin metal plate members. The hydrogen extraction unit is constructed by laminating these thin plate members and then bonding them together by diffusion bonding. Each of reformed gas flow channel holes formed in the reformed gas flow channel plates constitutes a flow channel for reformed gas together with a correspondingly adjacent one of the hydrogen separation plates. Each of purge gas flow channel holes formed in the purge gas flow channel plates constitutes, together with a correspondingly adjacent one of the hydrogen separation plates, a flow channel for purge gas with which hydrogen extracted from reformed gas is mixed.

33 Claims, 14 Drawing Sheets

LAMINATION BY DIFFUSION BONDING

HYDROGEN EXTRACTION UNIT

The disclosures of Japanese Patent Applications No. 2001-222079 filed on Jul. 23, 2001 and No. 2001-284437 filed on Sep. 19, 2001, each including the specification, drawings, and abstract are incorporated herein by reference in their entirety.

BACKGROUND OF THE INVENTION

1. Field of the Invention

The invention relates to a hydrogen extraction (/separation) unit for extracting hydrogen from a hydrogen-containing gas that contains hydrogen

2. Description of the Related Art

As a unit for extracting hydrogen from a hydrogen-containing gas, there has been known a unit making use of a hydrogen separation film including a metal that selectively allows penetration of hydrogen (e.g., palladium or a palladium alloy). Such a hydrogen extraction unit is employed, for example, in a fuel cell system having a fuel cell.

A fuel cell is designed to be supplied with fuel gas containing hydrogen and to obtain an electromotive force by an electrochemical reaction. As a method of applying a hydrogen extraction unit to a fuel cell system, it has been known to extract hydrogen from reformed gas (hydrogen-rich gas) obtained by reforming a hydrocarbonic fuel by means of the hydrogen extraction unit and to supply a fuel cell with the hydrogen thus obtained. In the hydrogen extraction unit thus constructed, if a flow channel through which the aforementioned reformed gas flows is formed on the side of one face of a hydrogen separation film, only the hydrogen contained in the reformed gas penetrates the hydrogen separation film. Hence, the hydrogen can be extracted in a flow channel formed on the side of the other face of the hydrogen separation film.

There has been proposed a hydrogen extraction unit equipped with a hydrogen separation film, which is constructed by laminating a plurality of first members, hydrogen separation films, and second members (see Japanese Patent Application Laid-Open No. 6-345408 and the like). Each of the first members constitutes a flow channel layer through which a hydrogen-containing gas such as the aforementioned reformed gas flows. Each of the second members constitutes a flow channel layer through which hydrogen extracted by the hydrogen separation film flows. By thus laminating the two members constituting the flow channel members between which the hydrogen separation film is interposed, it becomes possible to ensure a wider surface area of the hydrogen separation film in the unit as a whole and to enhance the hydrogen extraction efficiency.

However, not much consideration has been given so far to a method of connecting the flow channel constituting members and the hydrogen separation film when laminating them as described above. A structure for connecting flow channels constituted through lamination of members or a structure for ensuring airtightness of flow channels is required in end portions of each of the members that have been laminated.

As in the case where the hydrogen extraction unit thus constructed is installed in a vehicle together with a fuel cell and where the fuel cell is used as a power source for driving the vehicle, if the hydrogen extraction unit is used for purposes with a restricted space for installation, further reduction in size is desired. For example, as a construction for connecting a plurality of members with ensured airtightness, it has been known to dispose sealing members such as gaskets among the members to be connected. Nevertheless, such a concrete construction of the hydrogen extraction unit as will permit further reduction in size has been desired.

SUMMARY OF THE INVENTION

The invention has been made to solve the aforementioned problems of the related art. It is thus an object of the invention to provide an art for connecting members constituting a hydrogen extraction unit in such a manner as to permit further reduction in size of the hydrogen extraction unit.

To achieve the object stated above, the invention provides a hydrogen extraction unit which is designed to extract hydrogen from a hydrogen-containing gas that contains hydrogen and which comprises a hydrogen separation member, a first flow channel member, and a second flow channel member. The hydrogen separation member is designed as a thin metal plate member equipped with a hydrogen separation film that selectively allows penetration of hydrogen. The first flow channel member is disposed in a laminated manner, is designed as a thin metal plate member, is disposed adjacent to a first face of the hydrogen separation member, is bonded to the hydrogen separation member by a bonding method free from fusion of a base material, and constitutes, together with the hydrogen separation member adjacent to the first flow channel member, a hydrogen-containing gas flow channel and through which the hydrogen-containing gas flows. The second flow channel member is disposed in a laminated manner, is designed as a thin metal plate member, is disposed adjacent to a second face of the hydrogen separation member, is bonded to the hydrogen separation member by a bonding method free from fusion of a base material, and constitutes, together with the hydrogen separation member adjacent to the second flow channel member, a hydrogen flow channel and through which hydrogen penetrating the hydrogen separation film and extracted from the hydrogen-containing gas flows.

The invention also relates to a method of manufacturing a hydrogen extraction unit for extracting hydrogen from a hydrogen-containing gas that contains hydrogen. This method comprises the steps of preparing a hydrogen separation member designed as a thin metal plate member equipped with a hydrogen separation film that selectively allows penetration of hydrogen, preparing a flow channel member designed as a thin metal plate member and equipped with a flow channel constituting portion for constituting a gas flow channel between itself and the hydrogen separation member that is adjacent to the flow channel member when the hydrogen extraction unit has been assembled, laminating a plurality of members including the hydrogen separation member and the flow channel member in a predetermined sequence, and bonding the hydrogen separation member and the flow channel member together by a bonding method free from fusion of a base material.

DETAILED DESCRIPTION OF PREFERRED EMBODIMENTS

Modes of implementing the invention will now be described on the basis of some embodiments in the following sequence.

Figure 1:
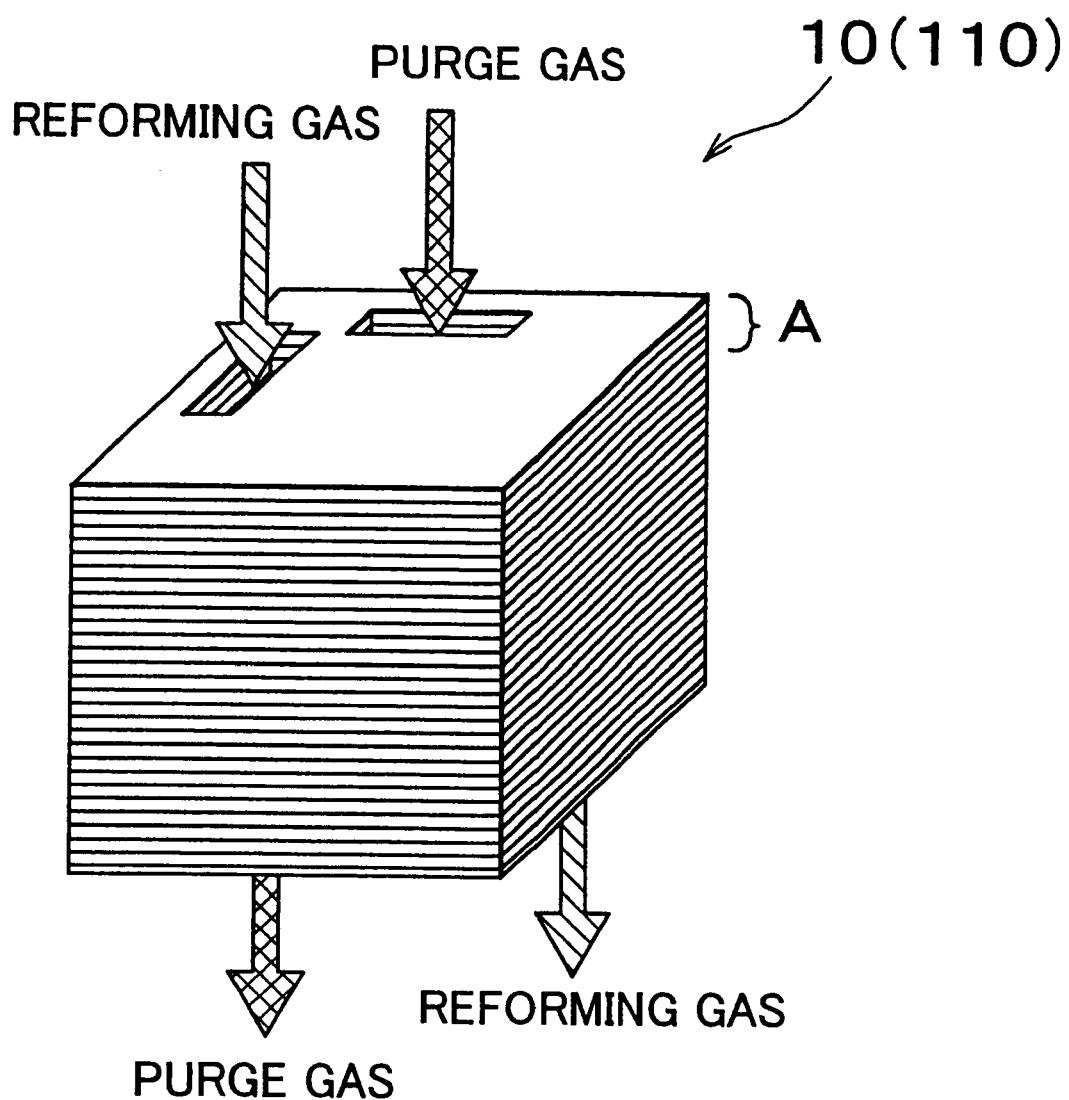
FIG. 1 is a perspective view of the external appearance of a hydrogen extraction unit 10.
Figure 2:
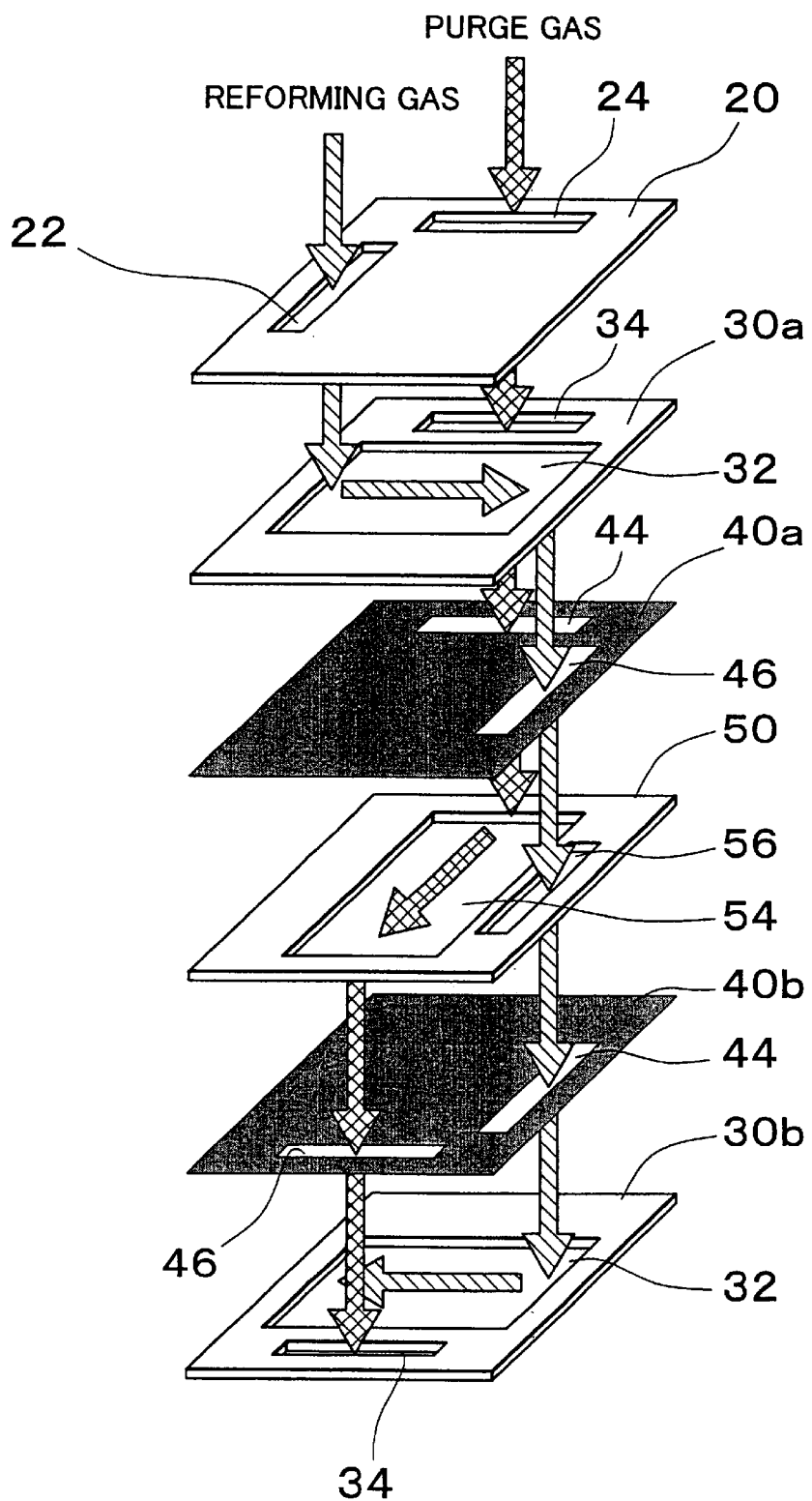
FIG. 2 is an exploded perspective view of plate members constituting the hydrogen extraction unit 10.

A. Construction of Hydrogen Extraction Unit 10 according to First Embodiment of the Invention:

B. Flow of Gas through Hydrogen Extraction Unit 10:

C. Method of Manufacturing Hydrogen Extraction Unit 10:

D. Application to Fuel Cell System:

E. Construction of Hydrogen Extraction Unit 110 according to Second Embodiment of the Invention:

F. Construction of Hydrogen Extraction Unit 210 according to Third Embodiment of the Invention:

G. Modification Examples:

A. Construction of Hydrogen Extraction Unit 10 according to First Embodiment of the Invention:

FIG. 1 is a perspective view of the external appearance of the hydrogen extraction unit 10 according to one preferred embodiment of the invention. The hydrogen extraction unit 10 of this embodiment is installed in a fuel cell system to extract hydrogen from reformed gas that is obtained by reforming a hydrocarbonic fuel. Hydrogen extracted by the hydrogen extraction unit 10 is supplied as fuel gas to a fuel cell disposed in the fuel cell system. The construction of the fuel cell system will be described later. As shown in FIG. 1, the hydrogen extraction unit 10 has a structure comprised of a plurality of layers of thin square plate members that are substantially identical in shape. FIG. 2 is an exploded perspective view of some of the plate members constituting the hydrogen extraction unit 10, that is, six of the plate members disposed in an upper end portion (indicated by "A" in FIG. 1) of the hydrogen extraction unit 10.

The hydrogen extraction unit 10 includes end plates 20, reformed gas flow channel plates 30, hydrogen separation plates 40, and purge gas flow channel plates 50 constituting purge gas flow channels. It is to be noted herein that each of the reformed gas flow channel plates corresponds to the first flow channel member, that each of the hydrogen separation plates corresponds to the hydrogen separation member, and that each of the purge gas flow channel plates corresponds to the second flow channel member.

The end plates 20 are disposed at upper and lower ends of the hydrogen extraction unit 10, respectively. The reformed gas flow channel plates 30 constitute flow channels for reformed gas (i.e., the first gas flow channels). Each of the hydrogen separation plates 40 is formed of a hydrogen separation film. The purge gas flow channel plates 50 constitute purge gas flow channels (i.e., the second gas flow channels) through which extracted hydrogen flows together with purge gas. Purge gas will be described later. As shown in FIG. 2, a reformed gas flow channel plate 30$a$, a hydrogen separation plate 40$a$, a purge gas flow channel plate 50$a$, a hydrogen separation plate 40$b$, and a reformed gas flow channel plate 30$b$ are disposed in this sequence. The reformed gas flow channel plate 30$a$ is disposed adjacent to the end plate 20 (which is disposed at the upper end of the hydrogen extraction unit 10 and will be referred to simply as the end plate 20). The reformed gas flow channel plate 30$a$ and the reformed gas flow channel plate 30$b$ are identical to each other. The hydrogen separation plate 40$a$ and the hydrogen separation plate 40$b$ are also identical to each other. In FIG. 2, each of the plates 30 and 40 is accompanied by "a" or "b" so as to clarify the sequence in which they are laminated. Hole portions of predetermined shapes are formed in each of the plate members at predetermined positions thereof. Each of the plate members is oriented in a predetermined direction corresponding to its sequence of lamination. By orienting the plate members in predetermined directions according to a predetermined sequence, the flow channels for reformed gas and the flow channels for purge gas are formed into desired shapes in the hydrogen extraction unit 10.

The end plate 20 has a reformed gas introduction hole 22 and a purge gas introduction hole 24 as hole portions. Reformed gas to be supplied to the hydrogen extraction unit 10 is introduced into the hydrogen extraction unit 10 through the reformed gas introduction hole 22. Purge gas to be supplied to the hydrogen extraction unit 10 is introduced into the hydrogen extraction unit 10 through the purge gas introduction hole 24. As will be described later, when manufacturing the hydrogen extraction unit 10, the plate members constituting the hydrogen extraction unit 10 are laminated in the predetermined sequence and subjected to a pressing force. The end plate 20 is made thicker than the other plate members so as to exhibit a sufficient rigidity against application of such a pressing force and to be connected to a pipe line through which reformed gas or purge gas is supplied and discharged. In this embodiment, the end plate 20 is made of stainless steel.

Figure 3:
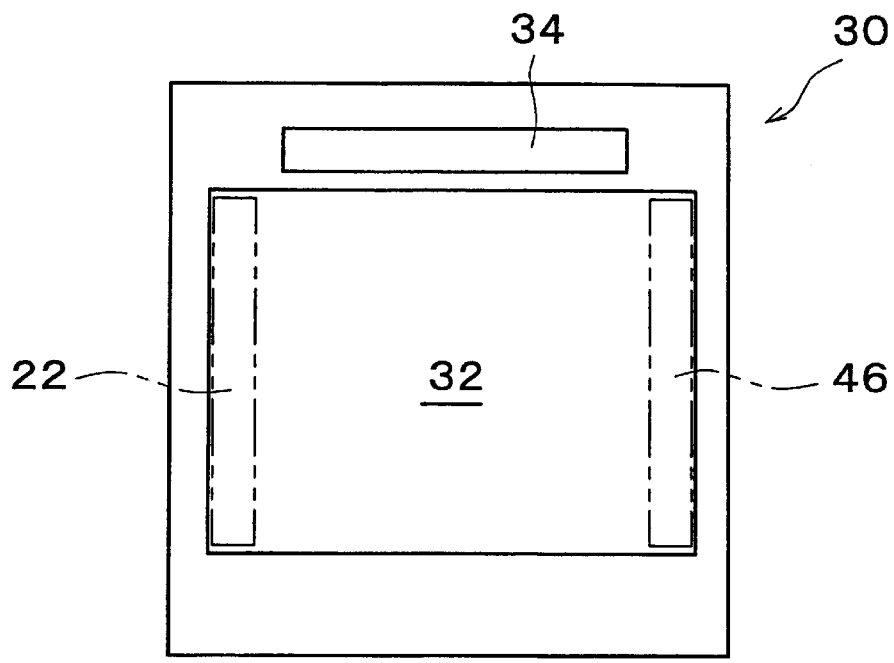
FIG. 3 is an explanatory view of the external appearance of a reformed gas flow channel plate 30.

FIG. 3 is an explanatory view of the external appearance of the reformed gas flow channel plate 30. The reformed gas flow channel plate 30 has a reformed gas flow channel hole 32 (i.e., a first gas flow channel hole portion) constituting a flow channel for reformed gas and a purge gas passage hole 34 constituting a flow channel for purge gas. The reformed gas flow channel hole 32 is a wide oblong hole portion formed in a central portion of the reformed gas flow channel plate 30. In the hydrogen extraction unit 10, a reformed gas flow channel through which reformed gas flows perpendicularly to the direction of lamination of the plate members is formed between the reformed gas flow channel hole 32 and the hydrogen separation plate 40 that is adjacent to the reformed gas flow channel hole 32. The purge gas passage hole 34 is a long, narrow oblong hole portion formed between one side of the reformed gas flow channel plate 30 and the reformed gas flow channel hole 32. In the hydrogen extraction unit 10, the purge gas passage hole 34 constitutes a purge gas flow channel through which purge gas flows parallel to the direction of lamination of the plate members. In this embodiment, the reformed gas flow channel plate 30 is made of stainless steel.

Figure 4:
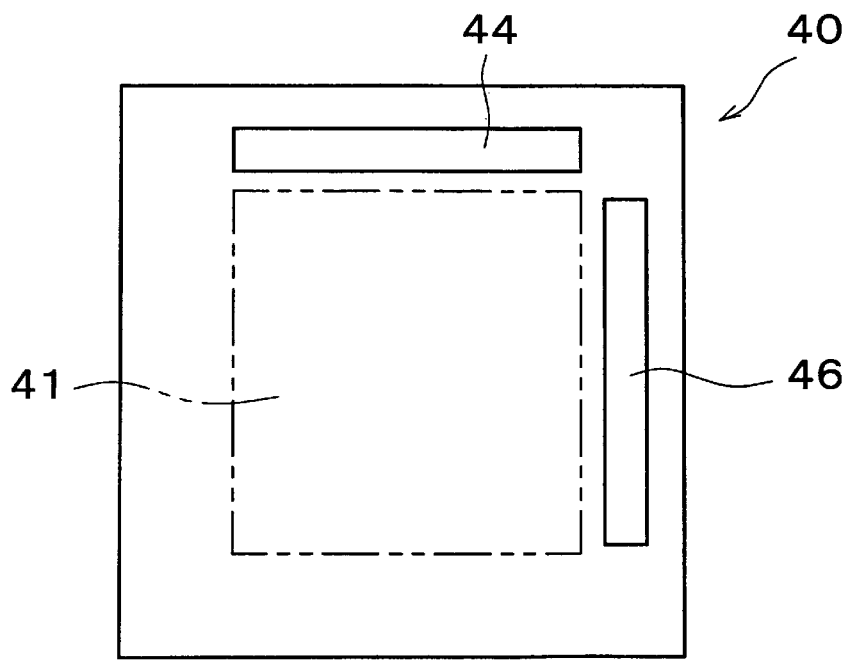
FIG. 4 is an explanatory view of the external appearance of a hydrogen separation plate 40.

FIG. 4 is an explanatory view of the external appearance of the hydrogen separation plate 40. The hydrogen separation plate 40 has gas passage holes 44, 46 as hole portions. The gas passage holes 44, 46 constitute flow channels for gas. The gas passage hole portions 44, 46 are long, narrow oblong hole portions that are formed along two adjacent sides of the hydrogen separation plate 40. In the hydrogen extraction unit 10, the gas passage holes 44, 46 constitute gas flow channels through which purge gas and reformed gas flow respectively parallel to the direction of lamination of the plate members. The hydrogen separation plate 40 of this embodiment is formed as a palladium foil, which selectively allows penetration of hydrogen. In the hydrogen separation plate 40, hydrogen is separated in a region where the reformed gas flow channel hole 32 formed in the reformed gas flow channel plate 30 adjacent to the hydrogen separation plate 40 and a later-described purge gas flow channel hole formed in the purge gas flow channel plate 50 adjacent to the hydrogen separation plate 40 overlap with each other. A hydrogen separation portion 41, that is, the region where hydrogen is thus separated is surrounded by alternate long and two short dashed lines in FIG. 4.

Figure 5:
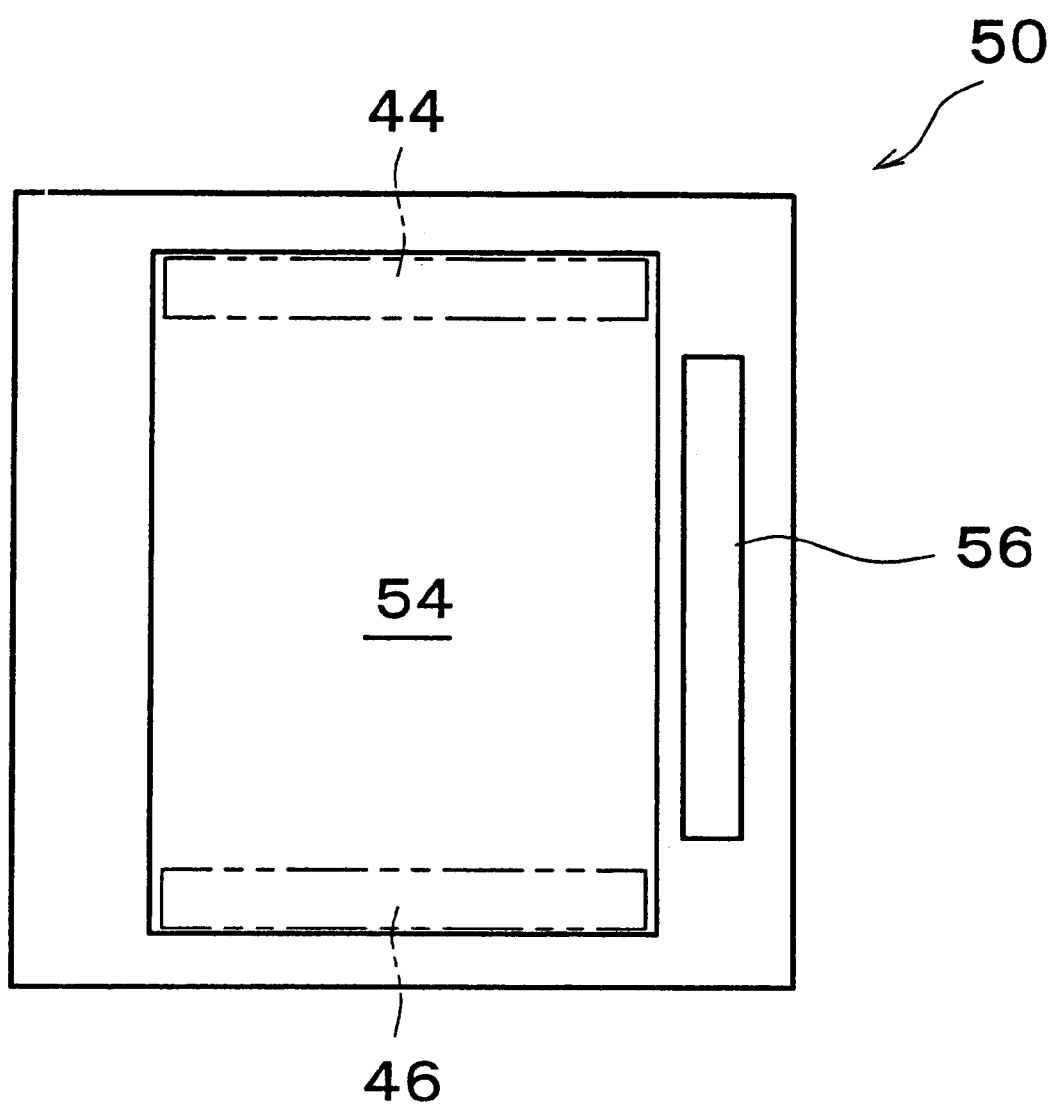
FIG. 5 is an explanatory view of the external appearance of a purge gas flow channel plate 50.

FIG. 5 is an explanatory view of the external appearance of the purge gas flow channel plate 50. The purge gas flow channel plate 50 has a purge gas flow channel hole 54 (i.e., a second gas flow channel hole portion) and a reformed gas passage hole 56 as hole portions. The purge gas flow channel hole 54 constitutes a flow channel for purge gas, and the reformed gas passage hole 56 constitutes a flow channel for reformed gas. The purge gas flow channel hole 54 is a wide oblong hole portion formed in a central portion of the purge gas flow channel plate 50. In the hydrogen extraction unit 10, a purge gas flow channel through which purge gas flows perpendicularly to the direction of lamination of the plate members is formed between the purge gas flow channel hole 54 and the hydrogen separation plate 40 that is adjacent to the purge gas flow channel hole 54. The reformed gas passage hole 56 is a long, narrow oblong hole portion formed between one side of the purge gas flow channel plate 50 and the purge gas flow channel hole 54. In the hydrogen extraction unit 10, the reformed gas passage hole 56 constitutes a reformed gas flow channel through which reformed gas flows parallel to the direction of lamination of the plate members. In this embodiment, the purge gas flow channel plate 50 is made of stainless steel.

When the aforementioned plate members are laminated, the reformed gas flow channel plate 30*a* adjacent to the end plate 20 is oriented such that the purge gas passage hole 34 overlaps with the purge gas introduction hole 24 formed in the end plate 20 (see FIG. 2). In this state, the reformed gas introduction hole 22 formed in the end plate 20 overlaps with one end portion of the reformed gas flow channel hole 32 formed in the reformed gas flow channel plate 30*a* (see FIG. 3).

The hydrogen separation plate 40*a* adjacent to the reformed gas flow channel plate 30*a* is oriented such that the gas passage hole 44 overlaps with the purge gas introduction hole 24 formed in the end plate 20 and the purge gas passage hole 34 formed in the reformed gas flow channel plate 30*a* (see FIG. 2). In this state, the gas passage hole 46 overlaps with one end portion of the reformed gas flow channel hole 32 formed in the reformed gas flow channel plate 30*a* (see FIG. 3). The gas passage hole 46 and the reformed gas introduction hole 22 are located along opposed sides of the reformed gas flow channel hole 32. In the hydrogen separation plate 40*a*, the gas passage hole 44 forms a purge gas flow channel through which purge gas flows parallel to the direction of lamination of the plate members. The gas passage hole 46 constitutes a reformed gas flow channel through which reformed gas flows parallel to the direction of lamination of the plate members.

The purge gas flow channel plate 50 adjacent to the hydrogen separation plate 40*a* is oriented such that the reformed gas passage hole 56 overlaps with the gas passage hole 46 formed in the hydrogen separation plate 40*a*. In this state, the gas passage hole 44 formed in the hydrogen separation plate 40*a* overlaps with one end portion of the purge gas flow channel hole 54 formed in the purge gas flow channel plate 50 (see FIG. 5).

The second hydrogen separation plate 40*b* is oriented such that the gas passage hole 44 overlaps with the reformed gas passage hole 56 formed in the purge gas flow channel plate 50. In this state, the gas passage hole 46 overlaps with one end portion of the purge gas flow channel hole 54 formed in the purge gas flow channel plate 50 (see FIG. 5). The gas passage hole 46 formed in the hydrogen separation plate 40*b* and the gas passage hole 44 formed in the hydrogen separation plate 40*a* are located along opposed sides of the purge gas flow channel hole 54. In the second hydrogen separation plate 40*b*, the gas passage hole 44 constitutes a reformed gas flow channel through which reformed gas flows parallel to the direction of lamination of the plate members. The gas passage hole 46 constitutes a purge gas flow channel through which purge gas flows parallel to the direction of lamination of the plate members.

Thus, the purge gas flow channel plate 50 or the reformed gas flow channel plate 30 is disposed alternately between two adjacent ones of the laminated hydrogen separation plates 40 in the light of the entire hydrogen extraction unit 10. In this state, two adjacent ones of the hydrogen separation plates 40 between which the reformed gas flow channel plate 30 or the purge gas flow channel plate 50 is disposed are laminated in such a state that the lower one is rotationally shifted clockwise by 90° with respect to the upper one in FIG. 2.

Two adjacent ones of the reformed gas flow channel plates 30, between which two corresponding ones of the hydrogen separation plates 40 and a corresponding one of the purge gas flow channel plates 50 are disposed, are sequentially laminated in such a state that they are rotationally shifted by 180° with respect to each other (see FIG. 2). By the same token, two adjacent ones of the purge gas flow channel plates 50, between which two corresponding ones of the hydrogen separation plates 40 and a corresponding one of the reformed gas flow channel plates 30 are disposed, are sequentially laminated in such a state that they are rotationally shifted by 180° with respect to each other.

B. Flow of Gas in Hydrogen Extraction Unit 10:

Arrows in FIG. 2 show how reformed gas and purge gas flow in the hydrogen extraction unit 10. Reformed gas to be supplied to the hydrogen extraction unit 10 is introduced to the inside through the reformed gas introduction hole 22 formed in the end plate 20. In the hydrogen extraction unit 10, while flowing through the reformed gas flow channel constituted by the reformed gas flow channel hole 32 formed in each of the reformed gas flow channel plates 30, reformed gas is used to separate hydrogen by means of a corresponding one of the hydrogen separation plates 40 adjacent to the reformed gas flow channel plate 30. In a space between reformed gas flow channels constituted by two adjacent ones of the reformed gas flow channel holes 32, reformed gas is introduced through the reformed gas flow channels constituted by the gas passage holes 44, 46 and the reformed gas passage hole 56, which are formed in the plates between the corresponding ones of the reformed gas flow channel plates 30. In this case, while reformed gas flows in one direction through the reformed gas flow channel constituted by the reformed gas flow channel hole 32 formed in one of two adjacent ones of the reformed gas flow channel plates 30, reformed gas flows in the opposite direction through the reformed gas flow channel constituted by the reformed gas flow channel hole 32 formed in the other reformed gas flow channel plate 30.

By the same token, purge gas to be supplied to the hydrogen extraction unit 10 is introduced to the inside through the purge gas introduction hole 24 formed in the end plate 20. In the hydrogen extraction unit 10, while purge gas flows through the purge gas flow channel constituted by the purge gas flow channel hole 54 formed in each of the purge gas flow channel plates 50, hydrogen extracted by the hydrogen separation plates 40 adjacent to the purge gas flow channel plate 50 is introduced. In a space between purge gas flow channels constituted by two adjacent ones of the purge gas flow channels 54, purge gas is introduced through the purge gas flow channel constituted by the gas passage holes 44, 46 and the purge gas passage hole 34, which are formed in the plates between the corresponding ones of the purge gas flow channel plates 50. In this case, while purge gas flows in one direction through the purge gas flow channel constituted by the purge gas flow channel hole 54 formed in one of two adjacent ones of the purge gas flow channel plates 50, purge gas flows in the opposite direction through the purge gas flow channel constituted by the purge gas flow channel hole 54 formed in the other purge gas flow channel plate 50.

Although FIG. 2 shows the end plate 20 disposed on the side where reformed gas and purge gas are introduced, the end plate 20 of the same type is disposed at the other end of the hydrogen extraction unit 10 as well. Two hole portions of the same type as the reformed gas introduction hole 22 and the purge gas introduction hole 24 are formed also in the end plate 20 that is disposed at the other end of the hydrogen extraction unit 10. Reformed gas which has flown through the reformed gas flow channel in the hydrogen extraction unit 10 and from which hydrogen has been separated is introduced to the outside through one of the two hole portions. Purge gas that has flown through the purge gas flow channel in the hydrogen extraction unit 10 and been mixed with the separated hydrogen is introduced to the outside through the other hole portion.

It is to be noted herein that purge gas refers to a gas to be supplied to the flow channel on the side into which extracted hydrogen flows so as to ensure that the hydrogen separation film extracts hydrogen with enhanced efficiency. That is, the hydrogen extraction unit 10 is designed such that purge gas flows through the purge gas flow channel and that purge gas carries away hydrogen that has been extracted from reformed gas through penetration of the hydrogen separation film. Thus, the hydrogen extraction unit 10 always maintains low hydrogen concentrations on the side of the purge gas flow channel and ensures high hydrogen extraction efficiency. Among gases that cause no inconvenience in later steps in which hydrogen taken out from the hydrogen extraction unit 10 is used and that exhibit a sufficiently low concentration of hydrogen, any one suited for the purpose can be selected as purge gas.

Figure 6:
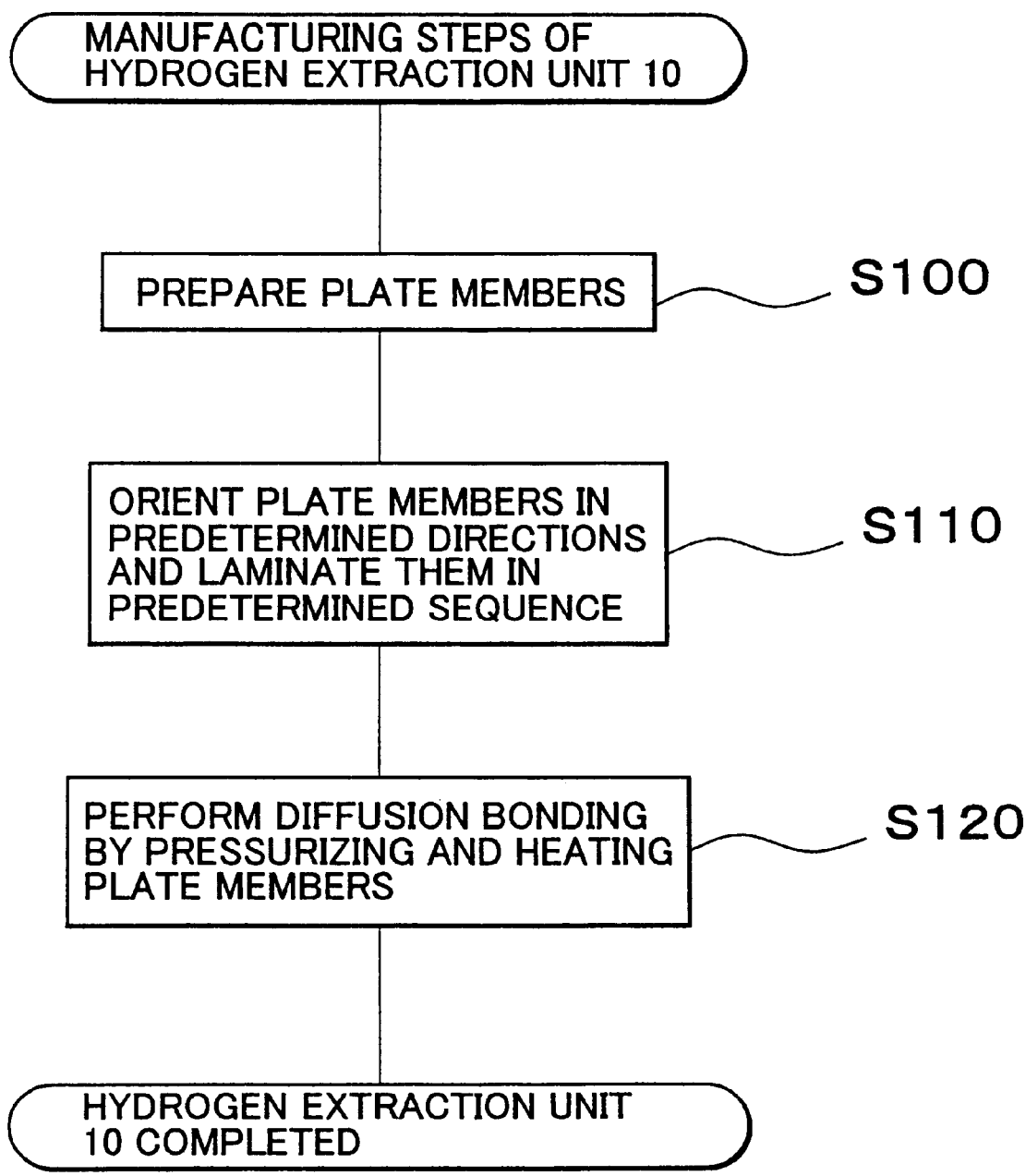
FIG. 6 is an explanatory view of the overall manufacturing steps of the hydrogen extraction unit 10.

C. Method of Manufacturing Hydrogen Extraction Unit 10:

FIG. 6 is an explanatory view of the overall manufacturing steps of the hydrogen extraction unit 10. In manufacturing the hydrogen extraction unit 10, the plate members constituting the hydrogen extraction unit 10 are prepared first (step S100). That is, hole portions of predetermined shapes are formed in stainless plates or palladium foils, which are then formed into a substantially identical rectangular shape and prepared as the end plates 20, the reformed gas flow channel plates 30, the purge gas flow channel plates 50, and the hydrogen separation plates 40. In this embodiment, the hole portions of the predetermined shapes are formed in the plate members by means of etching. Etching is a processing method including the steps of masking the surface of a metal member with a corrosion-resistant substance according to a predetermined shape and dissolving an unmasked portion of the metal member by means of a corrosive liquid to obtain a desired shape.

These plate members are then oriented in the predetermined directions as mentioned above and laminated in the predetermined sequence as mentioned above (step S110). The laminated plate members are then heated and pressurized, and two adjacent ones of the plate members are each bonded together by diffusion bonding (step S120), whereby the hydrogen extraction unit 10 is completed. In the case of actual operation, the hydrogen extraction unit 10 is connected to pipe lines through which reformed gas and purge gas are supplied to or discharged from the hydrogen extraction unit 10.

Diffusion bonding is a method including the steps of heating and pressurizing metal members to be bonded together at a temperature lower than their melting point and bonding them together with the aid of atomic diffusion. Both the metal members to be bonded together are diffused at their contact surfaces into each other and then integrated with each other. Metal members of different kinds can also be bonded together easily by diffusion bonding. In this embodiment, the plate members are heated and pressurized after having been laminated, and two adjacent ones of the plate members are each bonded together at their contact surfaces by means of diffusion bonding.

The hydrogen extraction unit 10 is constructed by laminating the thin metal plate members. Therefore, the unit can be made thinner and smaller as a whole. That is, the metal plates exhibiting high rigidity are employed as the members constituting the gas flow channels, whereby it becomes possible to make the members constituting the flow channels thinner. Accordingly, if it is assumed that the total area of hydrogen separation films (the number of hydrogen separation plates) employed in a lamination-type hydrogen extraction unit is constant, the unit can be made still thinner as a whole.

Furthermore, when such thin metal plate members are laminated, they are bonded together by diffusion bonding. Therefore, the unit can be made still thinner as a whole. Unlike other bonding methods such as welding, diffusion bonding does not involve fusion of base materials. There is no need to set the thickness of the base materials on the premise that the base materials will melt. Accordingly, it is not required that the thin plate members as the base materials for bonding be made thicker so as to be bonded together. Hence, the unit can be made sufficiently thin as a whole. In diffusion bonding, no other material intended for bonding is interposed among the base materials. Therefore, bonding does not cause an increase in the thickness of the entire unit.

By making the thin metal plate members constituting the gas flow channels in the hydrogen extraction unit 10, that is, the reformed gas flow channel plates 30 and the purge gas flow channel plates 50 thinner, it becomes possible to further reduce the cross-sectional areas of the gas flow channels formed in the hydrogen extraction unit 10. If gas is supplied to the hydrogen extraction unit 10 at a constant flow rate, the flow velocity of gas in each of the flow channels is increased as the cross-sectional area of that flow channel is reduced as described above. If the total area of the hydrogen separation films employed in the hydrogen extraction unit 10 is constant, the speed at which hydrogen is extracted through penetration of each of the hydrogen separation films is increased as the flow velocity of gas in the gas flow channel contiguous to that hydrogen separation film is increased. Accordingly, the hydrogen extraction efficiency in the hydrogen extraction unit 10 can be enhanced as a whole by making the thin plate members constituting the gas flow channels thinner.

As the thin plate members constituting the gas flow channels are made thinner to further reduce the cross-sectional areas of the gas flow channels, the pressure loss during passage of gas through the gas flow channels is increased as well. Thus, it is appropriate that the thicknesses of the thin plate members constituting the gas flow channels be set suitably in consideration of the effect of an increase in flow velocity resulting from the reduced cross-sectional areas of the flow channels, the effect of making it possible to ensure compactness of the entire unit, and the influence exerted by an increase in pressure loss. Taking a balance among these factors into account, the reformed gas flow channel plates 30 and the purge gas flow channel plates 50 can be formed into a thickness of e.g. 100 $\mu$m to 1 mm, preferably, 200 to 500 $\mu$m.

In this embodiment, each of the hydrogen separation plates 40 is formed of a palladium foil, that is, a metal self-supported film (a film formed exclusively from a certain metal). Therefore, it is possible to make the hydrogen separation plates 40 thinner and make the hydrogen extraction unit 10 more compact as a whole. It is appropriate that the thickness of the hydrogen separation plates 40 be set in consideration of the rigidity as members to be laminated, the efficiency of hydrogen penetration, and the like. For example, the hydrogen separation plates 40 can be formed into a thickness of 20 to 25 $\mu$m. To ensure the penetrability of hydrogen through palladium foils more sufficiently, it is appropriate that the hydrogen separation plates 40 be made thinner. For example, the hydrogen separation plates 40 may be formed into a thickness of about 1 $\mu$m. However, in the case where the hydrogen separation plates 40 are formed of metal foils as self-supported films, it is preferable in terms of rigidity that the hydrogen separation plates 40 be formed into a thickness equal to or greater than 10 $\mu$m. As is also apparent from this description, "the thin plate members" in the present specification includes foil-like members with thicknesses of 1 $\mu$m to dozens of micrometers as well. Metal foils made of metals other than palladium can also be employed as the hydrogen separation films that selectively allow penetration of hydrogen. For example, the hydrogen separation plates 40 can be made of metals with higher selective penetrability of hydrogen, such as vanadium, niobium, and tantalum. If the selective penetrability of hydrogen is sufficiently high, the hydrogen separation plates 40 can be formed into a thickness equal to or greater than the aforementioned values so as to ensure rigidity more sufficiently. It is also appropriate that the hydrogen separation plates 40 formed of metal foils be made of a plurality of metals that selectively allow penetration of hydrogen.

Although the thin metal plate members (i.e., the reformed gas flow channel plates 30, the purge gas flow channel plates 50, and the end plates 20) constituting the gas flow channels are made of stainless steel in this embodiment, they may be made of other metals. As long as these plate members exhibit sufficient rigidity, can be formed with sufficient precision by methods such as etching, and can be bonded to the hydrogen separation plates 40 by diffusion bonding, they can be made of any metals. For example, if the aforementioned thin plate members are made of a metal that is close in thermal expansion coefficient to a metal of which the hydrogen separation plates 40 are made, the rigidity and durability of the hydrogen extraction unit 10 can be enhanced.

By forming the plate members constituting the hydrogen extraction unit 10 from thinner metal plates and bonding them together by diffusion bonding to make the hydrogen extraction unit 10 more compact as a whole, it becomes possible to reduce the thermal capacity of the hydrogen extraction unit 10. Because the thermal capacity of the hydrogen extraction unit 10 is reduced, the energy required for warm-up can be reduced when the hydrogen extraction unit 10 is activated.

In this embodiment, the hydrogen extraction unit 10 is manufactured solely by means of punching, and there is no need to perform complicated machining. Therefore, it is possible to simplify the manufacturing steps and process the hydrogen extraction unit 10 into a desired shape with high precision. In this embodiment, such punching is based on etching. Etching is a processing method ensuring good conditions of cut surfaces to be formed. Further, there is no likelihood of deformation being caused by heat transmitted at the time of the process or the cut surfaces being oxidized in the course of the process. That is, etching is an excellent method that makes high-precision work possible when thin metal plates are used. In addition, etching does not require expensive dies designed for work and thus makes it possible to lower the manufacturing cost.

In this embodiment, since the thin plate members are bonded together by diffusion bonding, it is possible to laminate the thin plate members and then integrate them into a single body while performing diffusion bonding. Accordingly, the manufacturing steps can be simplified. It is to be noted herein that there is no need to bond all the members constituting the hydrogen extraction unit 10 together by diffusion bonding. As long as at least some of the members are bonded together by diffusion bonding, the effect of making the hydrogen extraction unit 10 compact can be achieved.

In the hydrogen extraction unit 10 of this embodiment, the flow channels through which reformed gas is supplied to or discharged from the flow channels constituted by the reformed gas flow channel holes 32 or the flow channels through which purge gas is supplied to or discharged from the flow channels constituted by the purge gas flow channel holes 54 are constituted by the hole portions formed in the plate members. Therefore, in order to allow gas to be supplied to or discharged from the flow channel contiguous to each of the hydrogen separation films, there is no need to provide any special structure for connecting the flow channels to a manifold. As a result, the hydrogen extraction unit 10 can be made compact as a whole.

Figure 7:
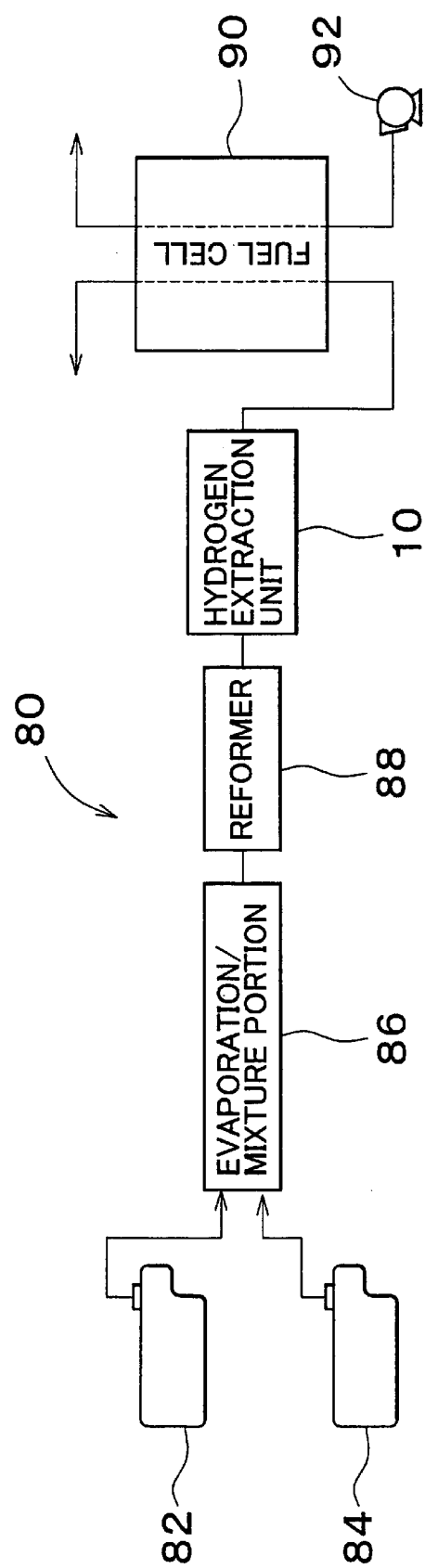
FIG. 7 is an explanatory view of the construction of a fuel cell system 80 equipped with the hydrogen extraction unit 10.

D. Application to Fuel Cell System:

As described already, the hydrogen extraction unit 10 is employed in a fuel cell system. The construction of a fuel cell system equipped with the hydrogen extraction unit 10 of this embodiment will be described hereinafter. FIG. 7 is an explanatory view of the overall construction of the fuel cell system 80, which is an exemplary fuel cell system equipped with the hydrogen extraction unit 10 of the aforementioned embodiment. The fuel cell system 80 is mainly composed of a fuel tank 82 for storing reformed fuel, a water tank 84 for storing water, an evaporation/mixture portion 86 for heating up and mixing reformed fuel and water, a reformer 88 having a reforming catalyst for promoting a reforming reaction, the hydrogen extraction unit 10, a fuel cell 90, and a blower 92.

Reformed gas stored in the fuel tank 82 is used for a reforming reaction proceeding in the reformer 88. Various hydrocarbonic fuels capable of producing hydrogen through a reforming reaction can be selected as the reformed fuel. These hydrocarbonic fuels include liquid hydrocarbons such as gasoline, alcohol or aldehyde groups such as methanol, and natural gas. The evaporation/mixture portion 86 is so structured as to gasify and heat up reformed gas supplied from the fuel tank 82 and water supplied from the water tank 84 and mix them together.

The mixture gas composed of water and reformed fuel discharged from the evaporation/mixture portion 86 is used for a reforming reaction in the reformer 88 and produces reformed gas (hydrogen-rich gas). The reformer 88 is equipped with a reforming catalyst corresponding to the type of reformed fuel to be used. The reformer 88 is controlled such that its internal temperature becomes equal to a temperature suited for a reaction for reforming the reformed fuel. As the reforming reaction proceeding in the reformer 88, various types of reactions can be selected. These reactions include a steam reforming reaction, a partial oxidation reaction, and a combination of both. It is appropriate that a reforming catalyst be selected in accordance with the reforming reaction that is to proceed in the reformer 88.

Reformed gas produced in the reformer 88 is supplied to the reformed gas flow channel in the hydrogen extraction unit 10 via the reformed gas introduction holes 22 formed in the end plates 20, which are components of the hydrogen extraction unit 10 as described above. Hydrogen is separated and extracted from this reformed gas. The extracted hydrogen is discharged from the purge gas flow channel in the hydrogen extraction unit 10 and is supplied to the anode side of the fuel cell 90 as a fuel gas. Compressed air is supplied from the blower 92 to the cathode side of the fuel cell 90 as an oxidizing gas. The fuel gas and oxidizing gas are utilized to cause an electrochemical reaction in the fuel cell 90 and generate an electromotive force.

Although FIG. 7 shows the main components of the fuel cell system, various types of reformed fuels can be selected as described above. It is appropriate that the construction of the fuel cell system 80 be changed in accordance with the type of reformed fuel to be used. For example, in the case where the reformed fuel to be used contains sulfur contents, it is appropriate that a desulfurizer be installed prior to the installation of the evaporation/mixture portion 86 so as to desulfurize the reformed gas. It is also appropriate that an additional unit for reducing the concentration of carbon monoxide contained in reformed gas be installed between the reformer 88 and the hydrogen extraction unit 10. For example, a shift portion equipped with a shift catalyst for promoting a shift reaction in which carbon dioxide and hydrogen are produced from carbon monoxide and water vapors, a CO selective oxidation portion equipped with a CO selective oxidation catalyst for promoting a carbon monoxide selective oxidation reaction in which carbon monoxide contained in reformed gas is oxidized by priority, or the like can be employed as the unit for reducing the concentration of carbon monoxide contained in reformed gas.

According to the fuel cell system 80 constructed as described above, hydrogen is extracted from reformed gas produced by the reformer 88 in the hydrogen extraction unit 10, and is supplied to the fuel cell 90 as a fuel gas. Accordingly, fuel gas containing extremely low concentrations of impurities such as carbon monoxide can be supplied to the fuel cell 90, and the power generation performance in the fuel cell 90 can be maintained stably. As described above, the hydrogen extraction unit 10 can be constructed compactly while the hydrogen separation films contributing to the extraction of hydrogen from reformed gas are guaranteed to have sufficient areas. As a result, the fuel cell system 80 can be made more compact as a whole.

In the embodiment described above, purge gas is used in extracting hydrogen with a view to enhancing the hydrogen extraction efficiency. In the hydrogen extraction unit 10 installed in the fuel cell system 80, it is appropriate that a gas that does not cause any inconvenience to an electrochemical reaction when being supplied to the fuel cell 90 be selected as purge gas. For example, it is also appropriate that water be gasified into vapors by means of an evaporator of a predetermined type and that the vapors be supplied to the purge gas flow channel as purge gas. Alternatively, it is also possible to adopt a construction wherein gases discharged from various members constituting the fuel cell system 80 are used as purge gas. For example, anode off gas that is discharged from the anode side of the fuel cell 90 after being used for an electrochemical reaction can be used as purge gas. And, cathode off gas that is discharged from the cathode side of the fuel cell 90 after being used for an electrochemical reaction can be also used as purge gas. Alternatively, it is also appropriate that gas obtained by further reducing the concentration of carbon monoxide contained in the residual reformed gas that is discharged from the hydrogen extraction unit 10 after the extraction of hydrogen in the hydrogen extraction unit 10 be used as purge gas.

It is also appropriate that a purge gas having a much lower concentration of hydrogen than the hydrogen-containing gas be supplied to the hydrogen flow channels.

Figure 8:
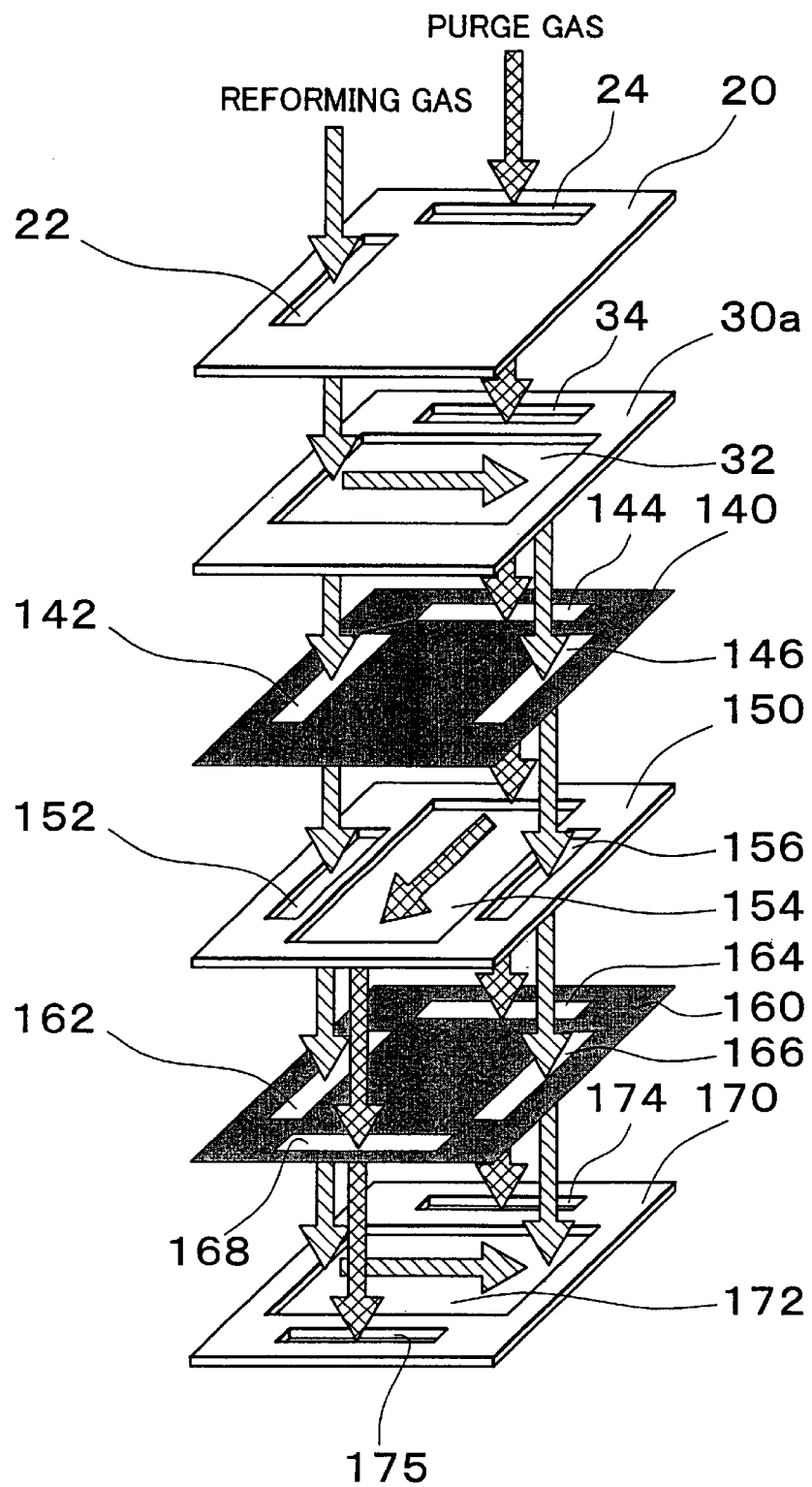
FIG. 8 is an explanatory view of the construction of a hydrogen extraction unit 110 according to a second embodiment of the invention.

E. Construction of Hydrogen Extraction Unit 110 according to Second Embodiment of the Invention:

FIG. 8 is an explanatory view of the construction of the hydrogen extraction unit 110 according to the second embodiment of the invention. As in the case of the hydrogen extraction unit 10 of the first embodiment, the hydrogen extraction unit 110 of the second embodiment is constructed by laminating metal plate members of a substantially identical rectangular shape. The hydrogen extraction unit 110 has the same external appearance as the hydrogen extraction unit 10 shown in FIG. 1. As is the case with FIG. 2, FIG. 8 is an exploded perspective view of some of the plate members constituting the hydrogen extraction unit 110, that is, six of the plate members disposed in one end portion of the hydrogen extraction unit 110. As described above, the flow channels which are formed parallel to the hydrogen separation plates 40 in a layered manner and through which reformed gas or purge gas flows are sequentially connected in series in the hydrogen extraction unit 10 of the first embodiment. On the other hand, flow channels which are formed parallel to hydrogen separation plates 40 in a layered manner and through which reformed gas or purge gas flows are connected in parallel in the hydrogen extraction unit 110 of the second embodiment.

The hydrogen extraction unit 110 has the end plates 20, the reformed gas flow channel plates 30, reformed gas flow channel plates 170, hydrogen separation plates 140, 160, and purge gas flow channel plates 150. These plates are made of the same metal material as in the case of the hydrogen extraction unit 10 of the first embodiment. Hole portions of predetermined shapes are formed in each of the plates at predetermined positions thereof. These hole portions are formed by etching as in the case of the first embodiment.

The end plates 20 and the reformed gas flow channel plates 30 assume the same shape as those of the first embodiment. As in the case of the hydrogen extraction unit 10, the hydrogen extraction unit 110 adopts an arrangement in which two hydrogen separation plates and one purge gas flow channel plate are interposed between two adjacent ones of reformed gas flow channel plates. Apart from the reformed gas flow channel plates 30 each of which is disposed adjacent to a corresponding one of the end plates 20, the reformed gas flow channel plates 170 are employed as the reformed gas flow channel plates. Each of the reformed gas flow channel plates 170 has a reformed gas flow channel hole 172 and a purge gas passage hole 174. The reformed gas flow channel hole 172 is the same as the reformed gas flow channel hole 32 formed in each of the reformed gas flow channel plates 30. The purge gas passage hole 174 is the same as the purge gas passage hole 34. In addition, each of the reformed gas flow channel plates 170 has a purge gas passage hole 175. The reformed gas flow channel hole 172 is located between the purge gas passage holes 174, 175, which are opposed to each other.

As in the case of the hydrogen extraction unit 10, the hydrogen extraction unit 110 adopts an arrangement in which a reformed gas flow channel plate or a purge gas flow channel plate is interposed between two adjacent ones of hydrogen separation plates. Apart from the hydrogen separation plates 140 each of which is disposed closest to a corresponding one of the end plates 20, the hydrogen separation plates 160 are employed as the hydrogen separation plates. As in the case of the gas passage holes 44, 46 formed in each of the hydrogen separation plates 40, each of the hydrogen separation plates 140 has gas passage holes 144, 146. A gas passage hole 142 is also formed in each of the hydrogen separation plates 140 along still another side thereof. Each of the hydrogen separation plates 160 has gas passage holes 162, 164, 166, and 168, each of which is formed along a corresponding one of four sides of that hydrogen separation plate 160.

As in the case of the hydrogen extraction unit 10, the hydrogen extraction unit 110 adopts an arrangement in which two hydrogen separation plates and one reformed gas flow channel plate are interposed between two adjacent ones of the purge gas flow channel plates 150. Each of the purge gas flow channel plates 150 has a purge gas flow channel hole 154 and a reformed gas passage hole 156. The purge gas flow channel hole 154 is the same as the purge gas flow channel hole 54 formed in each of the purge gas flow channel plates 50. The reformed gas passage hole 156 is the same as the reformed gas passage hole 56. In addition, each of the purge gas flow channel plates 150 has a reformed gas passage hole 152. The purge gas flow channel hole 154 is located between the reformed gas passage holes 152, 156, which are opposed to each other.

In the hydrogen extraction unit 110 constructed by laminating these plate members, reformed gas introduced into the hydrogen extraction unit 110 through the reformed gas introduction hole 22 flows parallel to the direction of lamination of the plate members through flow channels constituted by the reformed gas flow channel hole 32, the gas passage hole 142, the reformed gas passage hole 152, the gas passage hole 162, and the reformed gas flow channel hole 172. Reformed gas also flows perpendicularly to the direction of lamination of the plate members through flow channels which branch off from the flow channels extending parallel to the direction of lamination and which are constituted by the reformed gas flow channel hole 32 and the reformed gas flow channel hole 172. This reformed gas is used for the operation of extracting hydrogen. The remaining gas that has not been used for the extraction of hydrogen flows from the flow channels extending perpendicularly to the direction of lamination into flow channels constituted by the reformed gas flow channel hole 32, the gas passage hole 146, the reformed gas passage hole 156, the gas passage hole 166, and the reformed gas flow channel hole 172. This gas flows parallel to the direction of lamination of the plate members and is discharged to the outside.

By the same token, purge gas introduced into the hydrogen extraction unit 110 through the purge gas introduction hole 24 flows parallel to the direction of lamination of the plate members through flow channels constituted by the purge gas passage hole 34, the gas passage hole 144, the purge gas flow channel hole 154, the gas passage hole 164, and the purge gas passage hole 174. Purge gas also flows perpendicularly to the direction of lamination of the plate members through flow channels which branch off from the flow channels extending parallel to the direction of lamination and each of which is constituted by the purge gas flow channel hole 154. This purge gas is mixed with the extracted hydrogen. The purge gas that has been mixed with hydrogen flows from the flow channels extending perpendicularly to the direction of lamination into flow channels constituted by the purge gas flow channel hole 154, the gas passage hole 168, and the purge gas passage hole 175. This purge gas flows parallel to the direction of lamination of the plate members and is discharged to the outside.

In assembling the hydrogen extraction unit 110, the plate members are oriented in predetermined directions and laminated in a predetermined sequence such that the aforementioned flow channels are formed inside the hydrogen extraction unit 110. Two adjacent ones of the plate members are each bonded together by diffusion bonding Thus, the plate members are integrated as a whole. Pipe lines through which reformed gas and purge gas is supplied to or discharged from the hydrogen extraction unit 110 are connected to the plate members, whereby the hydrogen extraction unit 110 is completed.

The hydrogen extraction unit 110 thus constructed according to the second embodiment can substantially achieve the same effect as the hydrogen extraction unit 10 of the first embodiment. That is, the unit can be made compact as a whole by laminating the thin metal plate members and bonding them together by diffusion bonding. The hydrogen extraction efficiency can be enhanced by reducing the cross-sectional areas of the gas flow channels and thus increasing the flow velocity of gas. Further, the manufacturing steps can be simplified by forming the hole portions by etching and integrating the plate members into a single body by diffusion bonding. Furthermore, the effect of reducing the thermal capacity of the hydrogen extraction unit 110 can be achieved by making the unit compact. Because the flow channels through which gas is supplied to or discharged from the flow channels disposed contiguous to the hydrogen separation films are constituted by the hole portions formed in the plate members, the unit can be made more compact as a whole. As in the case of the first embodiment, the hydrogen extraction unit 110 of this embodiment can be applied to a system making use of hydrogen, for example, to the fuel cell system 80.

By adopting such a construction, it becomes unnecessary to provide any special structure for connecting the hydrogen-containing gas flow channels to the flow channels for distributing the hydrogen-containing gas or any special structure for connecting the hydrogen flow channels to the flow channels into which the hydrogen that has flown past the hydrogen flow channels flows. Thus, the manufacturing steps can be simplified, and the shape of the hydrogen extraction unit can be inhibited from becoming complicated.

Figure 9:
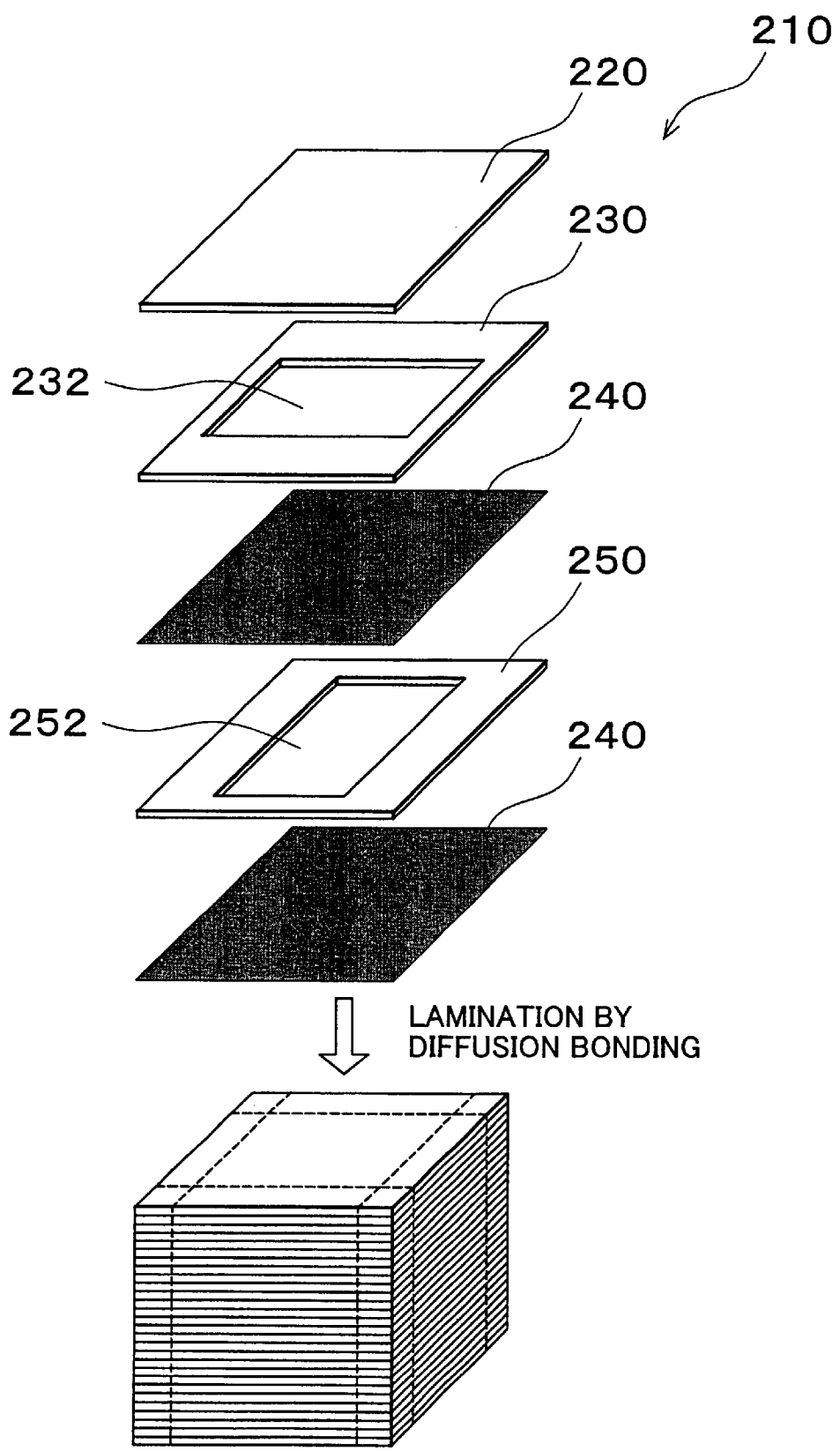
FIG. 9 is an explanatory view of manufacturing steps of a hydrogen extraction unit 210 according to a third embodiment of the invention.

F. Construction of Hydrogen Extraction Unit 210 according to Third Embodiment of the Invention:

FIG. 9 is an explanatory view of the manufacturing steps of the hydrogen extraction unit 210 according to the third embodiment of the invention. As in the cases of the aforementioned embodiments, the hydrogen extraction unit 210 of the third embodiment is manufactured by laminating rectangular metal plate members that are substantially identical in shape. The hydrogen extraction unit 210 has end plates 220, reformed gas flow channel plates 230, hydrogen separation plates 240, and purge gas flow channel plates 250. These plates are made of the same metal material as in the aforementioned embodiments. Hole portions of predetermined shapes are formed in the reformed gas flow channel plates 230 at predetermined positions thereof. These hole portions are formed by etching as in the case of the first embodiment.

The end plates 220 are thin plate members having no hole portions. Each of reformed gas flow channel holes 232, which are long oblong hole portions, is formed in a corresponding one of the reformed gas flow channel plates 230 in a central portion thereof. As in the case of the hydrogen extraction unit 10, the hydrogen extraction unit 210 adopts an arrangement in which two hydrogen separation plates and one purge gas flow channel plate are interposed between two adjacent ones of the reformed gas flow channel plates 230.

The hydrogen separation plates 240 are thin plate members having no hole portions. As in the case of the hydrogen extraction unit 10, the hydrogen extraction unit 210 adopts an arrangement in which a reformed gas flow channel plate or a purge gas flow channel plate is interposed between two adjacent ones of the hydrogen separation plates 240.

Each of purge gas flow channel holes 252, which are wide oblong hole portions, is formed in a corresponding one of the purge gas flow channel plates 250 in a central portion thereof. As in the case of the hydrogen extraction unit 10, the hydrogen extraction unit 210 adopts an arrangement in which two hydrogen separation plates and one reformed gas flow channel plate are interposed between two adjacent ones of the purge gas flow channel plates 250.

In assembling the hydrogen extraction unit 210, the aforementioned plate members are laminated in a predetermined sequence. Two adjacent ones of the plate members are each bonded together by diffusion bonding, whereby the plate members are integrated into a single body as a whole. In this state, the reformed gas flow channel plates 230 and the purge gas flow channel plates 250 are oriented such that the longitudinal direction of the reformed gas flow channel holes 232 and the longitudinal direction of the purge gas flow channel holes 252 cross at right angles. In this embodiment, after the aforementioned plate members have been laminated and integrated by diffusion bonding into a laminated body, the laminated body is then cut along broken lines shown in FIG. 9.

Figure 10:
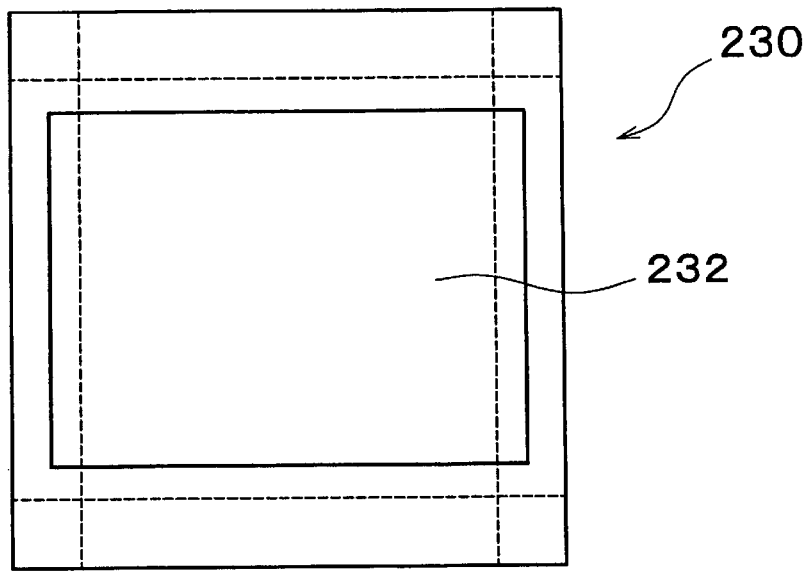
FIG. 10 is an explanatory view of how to cut a laminated body, represented in the form of a plan view of a reformed gas flow channel plate 230.
Figure 11:
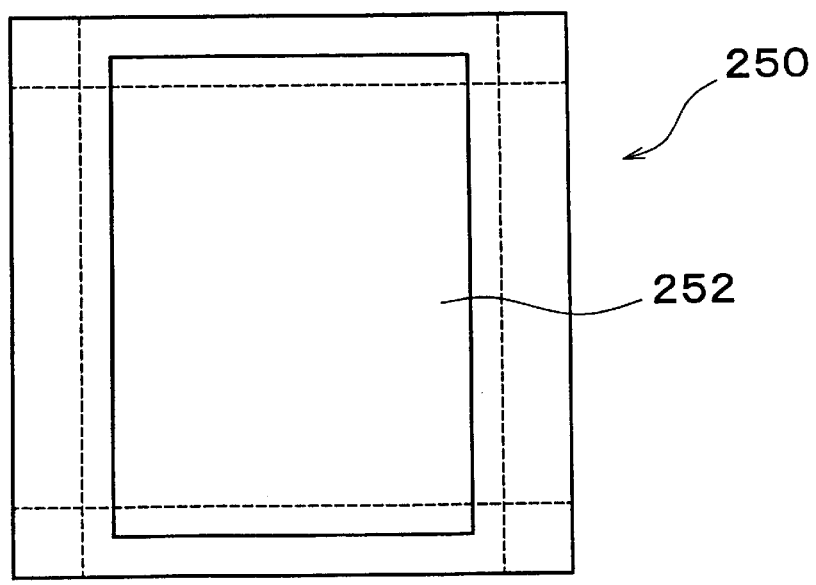
FIG. 11 is an explanatory view of how to cut the laminated body, represented in the form of a plan view of a purge gas flow channel plate 250.
Figure 12:
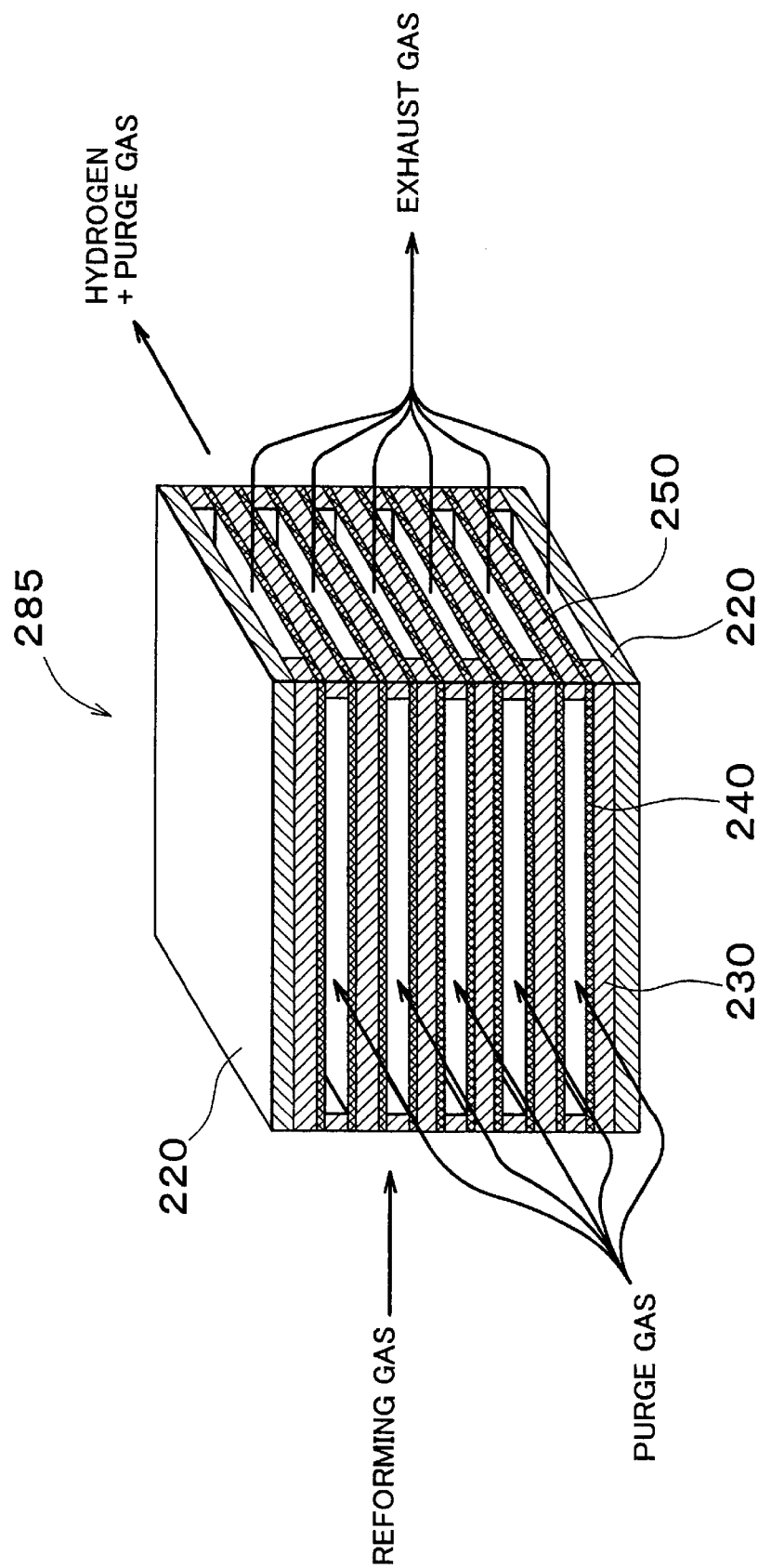
FIG. 12 is an explanatory view of the laminated body after it has been cut along broken lines.

FIGS. 10 and 11 are explanatory views of how to cut the laminated body, represented in the form of a plan view of the reformed gas flow channel plate 230 and a plan view of the purge gas flow channel plate 250 respectively. FIG. 12 is an explanatory view of a laminated body 285 that has been cut along the aforementioned broken lines. Reformed gas flow channels or purge gas flow channels are opened in four sides of the laminated body 285 that has been cut along the aforementioned broken lines.

Figure 13:
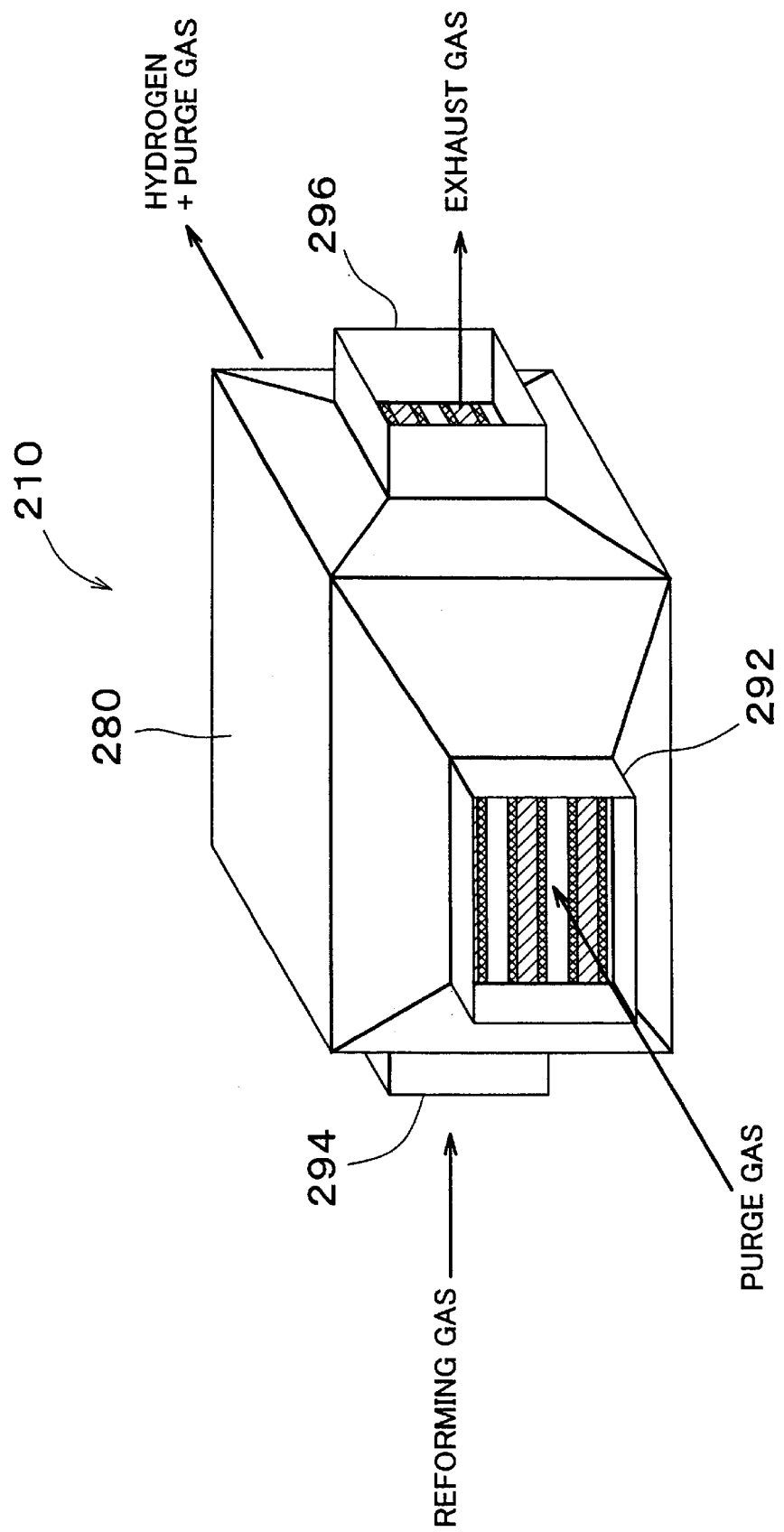
FIG. 13 is an explanatory view of the external appearance of the hydrogen extraction unit 210 having a casing in which the laminated body is accommodated.

In this embodiment, the integrated body 285 shown in FIG. 12 is accommodated in a casing 280 (see FIG. 13), whereby the hydrogen extraction unit 210 is completed. FIG. 13 shows the external appearance of the hydrogen extraction unit 210 having the integrated body 285 accommodated in the casing 280. The casing 280 is provided with four manifolds corresponding to the four sides of the integrated body 285 in which the reformed gas flow channels or the purge gas flow channels are opened. A front face of the casing 280 shown in FIG. 13 has a manifold 292 for supplying purge gas. A left side face of the casing 280 has a manifold 294 for supplying reformed gas. A right side face of the casing 280 has a manifold 296 for discharging the residual reformed gas from which hydrogen has been separated. A back face of the casing 280, which is invisible in FIG. 13, has a manifold for discharging hydrogen that has been extracted together with purge gas.

A space between the laminated body 285 and the casing 280 for accommodating the laminated body 285 is sealed so as to prevent gases that have been supplied or discharged from being mixed with each other. That is, predetermined seal members for ensuring airtightness are disposed in regions of contact between upper and lower faces of the laminated body 285 and an inner wall of the casing and in regions of contact between corner portions of the sides of the laminated body 285 and the inner wall of the casing. By supplying or discharging predetermined gases through the aforementioned manifolds in such a sealed structure, it becomes possible to separate hydrogen from reformed gas without allowing the gases to be mixed with each other inside the unit.

The hydrogen extraction unit 210 constructed as described above according to the third embodiment can substantially achieve the same effect as the hydrogen extraction unit 10 of the first embodiment. That is, the unit can be made compact as a whole by laminating the thin metal plate members and bonding them together by diffusion bonding. The hydrogen extraction efficiency can be enhanced by reducing the cross-sectional areas of the gas flow channels and thus increasing the flow velocity of gas. Further, the manufacturing steps can be simplified by forming the hole portions by etching and integrating the plate members into a single body by diffusion bonding. Furthermore, the effect of reducing the thermal capacity of the hydrogen extraction unit 210 can be achieved by making the unit compact. As in the case of the first embodiment, the hydrogen extraction unit 210 of this embodiment can be applied to a system making use of hydrogen, for example, to the fuel cell system 80. Also, since the hydrogen extraction unit 210 of this embodiment has the casing 280 in which the laminated body 285 formed by laminating the plate members is accommodated, the pipe line structures for reformed gas and purge gas can be simplified.

G. Modification Examples:

The invention is not limited to the aforementioned embodiments or the modes of implementation and can be implemented in various manners without departing from the spirit thereof. For instance, the following modifications are possible as well.

G1. Modification Example 1:

Although the metal plate members are bonded together by diffusion bonding in the aforementioned embodiments, they may also be bonded together by brazing. As in the case of diffusion bonding, brazing is also a bonding method free from fusion of base materials. Accordingly, the base materials, namely, the reformed gas flow channel plates, the purge gas flow channel plates, and the hydrogen separation plates need not be increased in thickness so as to be bonded together. By disposing sufficiently thin solder among the base materials, it becomes possible to make the hydrogen extraction unit compact as a whole.

By performing at least one of etching, electric discharge machining, laser machining, and electrochemical machining, it becomes unnecessary to perform complicated machining. As a result, the hydrogen extraction unit can be manufactured easily, and the manufacturing steps can be simplified.

G2. Modification Example 2:

Although the hole portions formed in the metal plate members are formed by etching in the aforementioned embodiments, they may also be formed by electric discharge machining (e.g., wire cut), laser machining, or press working. As long as the hole portions can be processed with acceptable precision, any method can be adopted.

G3. Modification Example 3:

Although the hydrogen separation plates are formed of self-supported films made of metal foil having the function of separating hydrogen, it is also appropriate that the hydrogen separation plates be constructed by forming a metal having the function of separating hydrogen (hereinafter referred to as the hydrogen separation metal) on thin porous base materials. By forming the hydrogen separation metal on the metal porous base materials, it becomes possible to enhance the rigidity of the hydrogen separation plates. In such a case as well, the effect of making the unit compact can be achieved by bonding the thin metal plate members together by a bonding method free from fusion of the base materials.

It is to be noted herein that various methods can be adopted as a method of forming the hydrogen separation metal on the porous base materials. For example, it is appropriate that the surfaces of the porous base materials be coated with the hydrogen separation metal by means of plating, chemical vapor deposition (CVD), physical vapor deposition (PVD), or the like. Alternatively, it is also appropriate that the hydrogen separation metal be carried by pores of the porous base materials. For example, an impregnation carrying method in which porous base materials are dipped in a solution containing a hydrogen separation metal can be adopted as a method of carrying the hydrogen separation metal.

In the case where hydrogen separation plates having a hydrogen separation metal formed on porous metal base materials are employed, if diffusion bonding is performed as in the case of the aforementioned embodiments, the porous base materials are crushed due to application of loads at the time of bonding, whereby it becomes possible to achieve sufficient sealing performance in the sides of a laminated body. Alternatively, in order to ensure sealing performance in the peripheral regions of the porous base materials, it is also appropriate that those peripheral regions be coated with a metal substantially having no function of separating hydrogen.

G4. Modification Example 4:

Although the gas flow channels contiguous to the hydrogen separation films are constituted by the hole portions (the gas flow channel holes) formed in the reformed gas flow channel plates and the purge gas flow channel plates in the aforementioned embodiments, the structure for forming the gas flow channels (the gas flow channel constituting portion) can be constructed differently. Instead of forming the hole portions in the aforementioned gas flow channel plates, it is also appropriate that a predetermined convexo-concave structure be formed on the surface of each of the gas flow channel plates and that a gas flow channel be formed between the convexo-concave structure and a corresponding one of the hydrogen separation films. In such a case as well, desired convexo-concave structures can be formed on the metal plates by etching with high precision.

G5. Modification Example 5:

In the hydrogen extraction unit 10 shown in FIG. 2, reformed gas and purge gas are introduced into the hydrogen extraction unit from the same end portion. However, it is also preferable to adopt a construction in which reformed gas and purge gas are introduced from opposed end portions of the hydrogen extraction unit. In the hydrogen extraction unit, since hydrogen is extracted in each of the reformed gas flow channels, the concentration of hydrogen is reduced in proportion to a decrease in the distance from a downstream end thereof. Further, since hydrogen is extracted in each of the purge gas flow channels, the concentration of hydrogen is increased in proportion to a decrease in the distance from a downstream end thereof. The efficiency of extracting hydrogen by means of the hydrogen separation films is increased in proportion to an increase in the difference between the concentrations of hydrogen contained in reformed gas and purge gas. Thus, if reformed gas and purge gas are introduced from opposed end portions of the hydrogen extraction unit, the hydrogen extraction unit is guaranteed to have a certain difference between the concentrations of hydrogen contained in reformed gas and purge gas. As a result, the hydrogen extraction efficiency of the hydrogen extraction unit can be enhanced as a whole.

G6. Modification Example 6:

Although purge gas flows through the gas flow channels opposed to the reformed gas flow channels across the hydrogen separation films in the aforementioned embodiments, it is also possible to adopt a construction in which purge gas is not used. Even if purge gas is not caused to flow positively, it is possible to extract hydrogen from reformed gas in accordance with a difference between the concentrations of hydrogen contained in the flow channels disposed on the opposed sides of each of the hydrogen separation films, and to recover the hydrogen.

G7. Modification Example 7:

Further, it is also possible to adopt a construction wherein porous bodies are disposed in the reformed gas flow channels constituted by the reformed gas flow channel plates, wherein reforming catalysts are carried on the porous bodies, and wherein a reforming reaction is caused to proceed in the reformed gas flow channels. That is, it is also possible to form the hydrogen extraction unit and the reformer integrally. It is also appropriate that a catalyst designed to reduce the concentration of carbon monoxide, such as the shift catalyst or the CO selective oxidation catalyst mentioned above, be carried by the hydrogen extraction unit. In such a case as well, the effect of making the entire unit thinner can be achieved by bonding the thin metal plate members having the porous bodies disposed in the hole portions together by a bonding method free from fusion of the base materials.

G8. Modification Example 8:

In the foregoing description, the hydrogen extraction unit is designed to extract hydrogen from reformed gas. However, it is also appropriate that the hydrogen extraction unit of the invention be used to extract hydrogen from a hydrogen-containing gas other than reformed gas. Further, it is also appropriate that hydrogen to be extracted from a hydrogen-containing gas by means of hydrogen separation films and discharged from the hydrogen extraction unit be supplied to a hydrogen consumption unit other than a fuel cell. Alternatively, it is also appropriate that hydrogen be stored temporarily instead of being supplied to such a hydrogen consumption unit directly.

G9. Modification Example 9:

It is appropriate that either a group five metal or a group five metal alloy be used as the porous base materials of the hydrogen separation members of the hydrogen extraction unit. Group five metals or their alloys are highly pervious to hydrogen and thus make it possible to extract hydrogen effectively.

It is to be noted herein that the invention can be implemented in a variety of other manners. For example, the invention can be implemented as a method of manufacturing the hydrogen extraction unit or a fuel cell system equipped with the hydrogen extraction unit. The fuel cell system of the invention is equipped with a fuel cell that is supplied with a gas containing hydrogen and a gas containing oxygen and that gains an electromotive force through an electrochemical reaction in which the gases are used. The gist of the invention is that the fuel cell system is equipped with the hydrogen extraction unit constructed as described above and makes use of hydrogen extracted by the hydrogen extraction unit for the electrochemical reaction. The fuel cell system constructed as described above according to the invention is equipped with the hydrogen extraction unit of the invention and thus can be made more compact as a whole.

Another mode of implementing the invention will now be described on the basis of a fourth embodiment of the invention in the following sequence.

Figure 14:
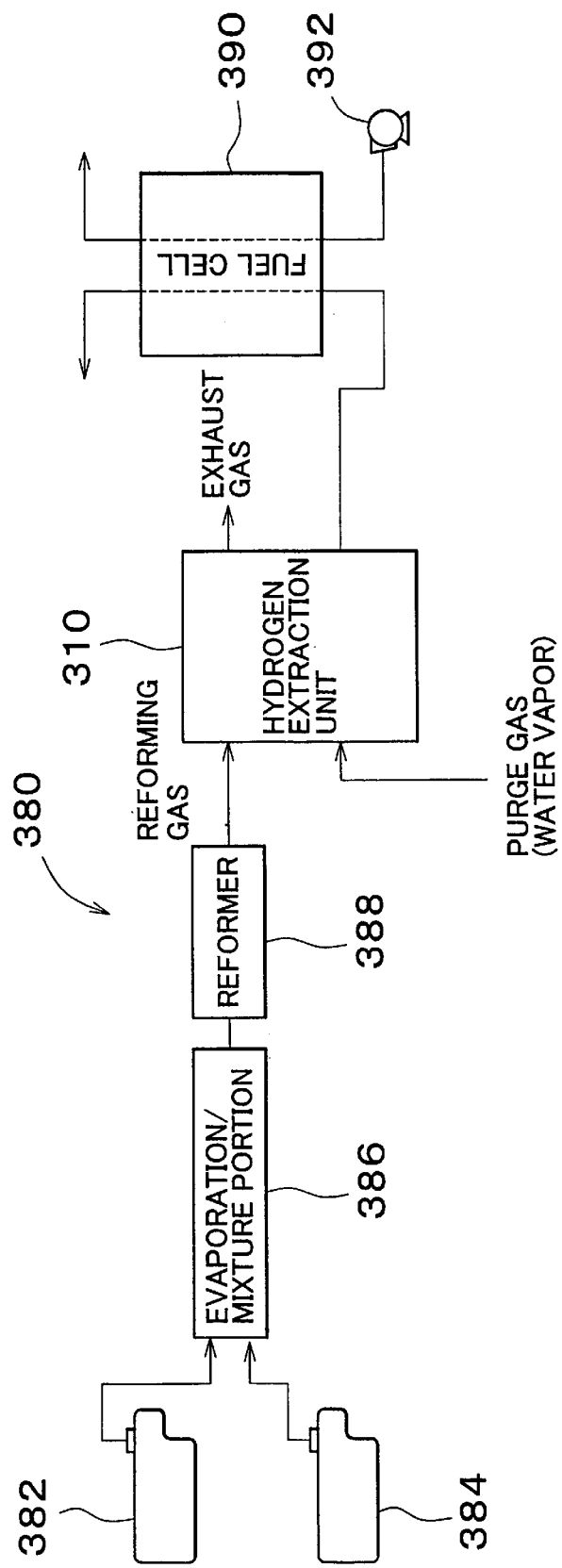
FIG. 14 is an explanatory view of the overall construction of a fuel cell system employing a hydrogen extraction unit according to an embodiment of the invention.

- A. System Construction:
- B. Construction of Hydrogen Extraction Unit:
- C. Detailed Structure of Hydrogen Separation Plates:
- D. Detailed Structure of Flow Channel Plates:
- E. Detailed Structure of End Plates:
- F. Method of Manufacturing Hydrogen Extraction Unit
- G. Modification Examples:

A. System Construction:

FIG. 14 is an explanatory view of the overall construction of a fuel cell system employing a hydrogen extraction unit according to the embodiment of the invention. A fuel cell system 380 generates power through an electrochemical reaction of hydrogen and oxygen that are supplied to a fuel cell 390. Compressed air supplied from a blower 392 is used as oxygen. Hydrogen is produced by reforming a raw material by means of a mechanism described below. Various hydrocarbonic fuels capable of producing hydrogen by a reforming reaction, including liquid hydrocarbons such as gasoline, alcohols such as methanol, aldehyde groups, and natural gas, can be selected as the raw material.

A raw material tank 382, a water tank 384, an evaporation/mixture portion 386, and a reformer 388 are identical to the raw material tank 82, the water tank 84, the evaporation/mixture portion 86, and the reformer 88 of the first embodiment respectively and thus will not be described below in any further detail.

The hydrogen extraction unit 310 is supplied with reformed gas, from which hydrogen is then separated. The hydrogen extraction unit 310 is also supplied with purge gas for promoting the separation of hydrogen. In this embodiment, water vapor is used as purge gas. Various gases such as inactive gas, off gas for the fuel cell 390, or the like can be used as purge gas. It is also possible to adopt a construction in which no purge gas is used. The hydrogen thus separated is supplied to the fuel cell 390.

Figure 15:
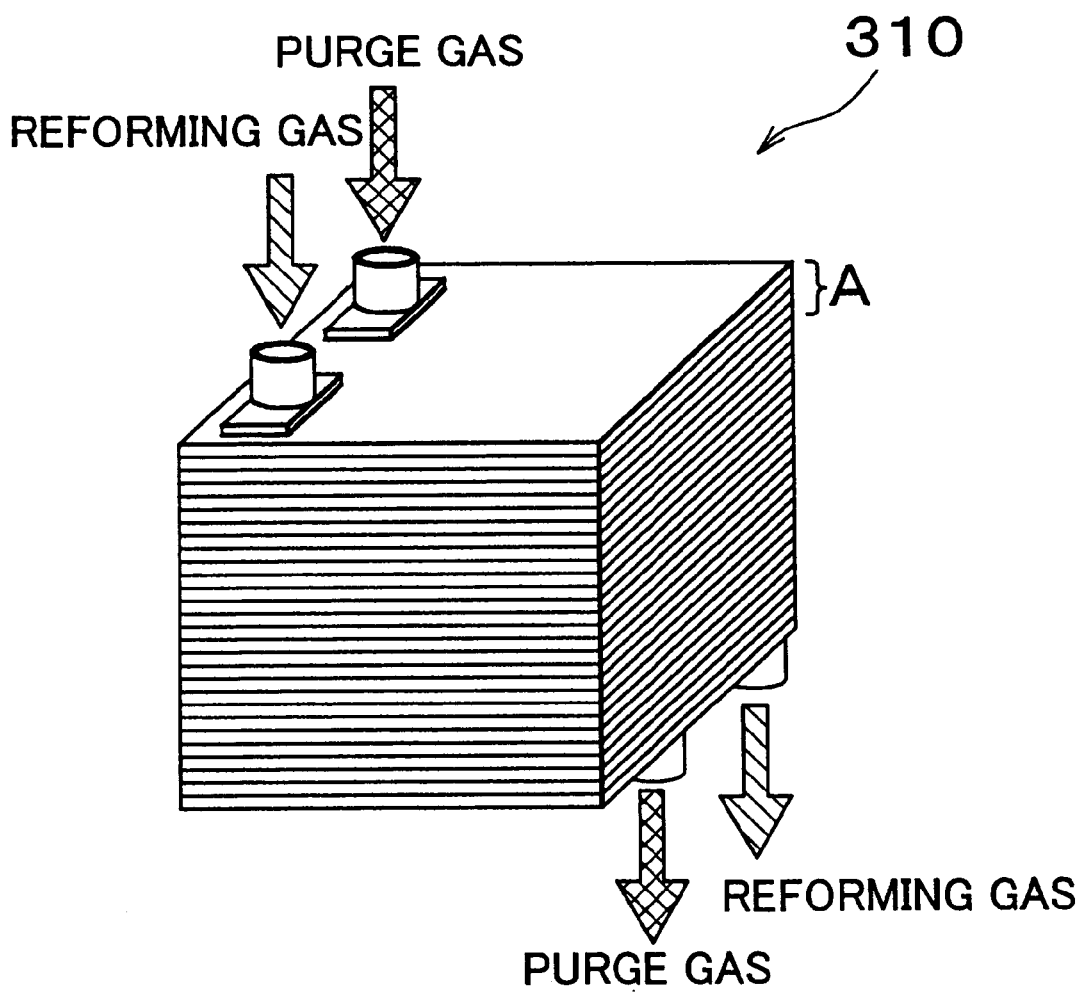
FIG. 15 is a perspective view of a hydrogen extraction unit 310.

B. Construction of Hydrogen Extraction Unit:

FIG. 15 is a perspective view of the hydrogen extraction unit 310. The hydrogen extraction unit 310 has a laminated structure of a plurality of thin square plate members. Inlet ports for reformed gas and purge gas are formed at one end of the laminated structure, and outlet ports for reformed gas and purge gas are formed at the other end of the laminated structure.

Figure 16:
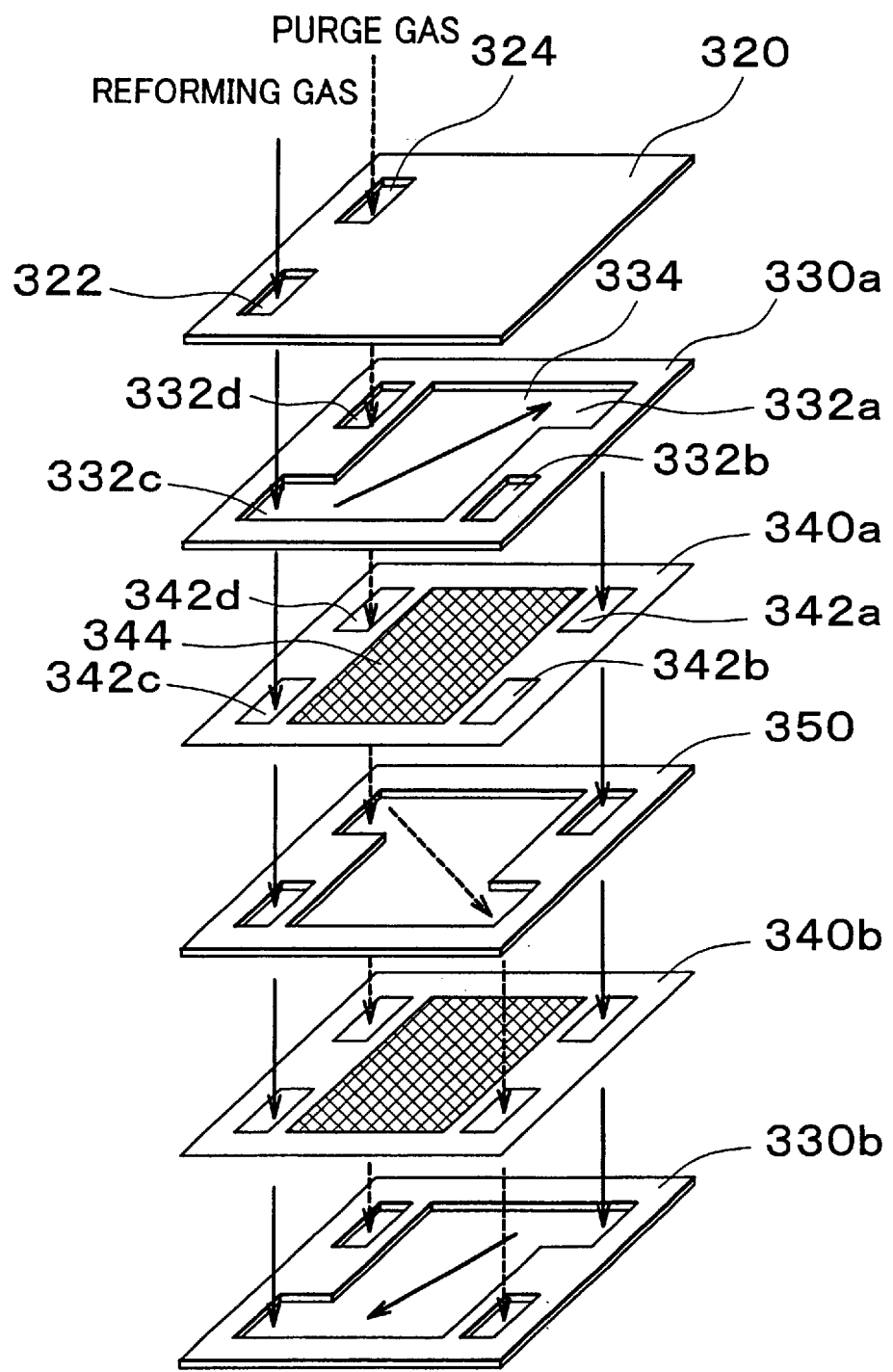
FIG. 16 is an exploded perspective view of a part of the hydrogen extraction unit 310.

FIG. 16 is an exploded perspective view of part of the hydrogen extraction unit 310. FIG. 16 shows a portion corresponding to an "A" portion in FIG. 15. End plates 320 are disposed at opposed ends of the laminated structure. Each of the end plates 320 has a reformed gas introduction hole 322 and a purge gas introduction hole 324. In a lamination below the end plate 320 shown in FIG. 16, reformed gas flow channel plates 330a, 330b, a purge gas flow channel plate 350, and hydrogen separation plates 340a, 340b are disposed alternately.

Each of the reformed gas flow channel plates 330a, 330b and the purge gas flow channel plate 350 is classified into a first flow channel plate or a second flow channel plate depending on the type of gas flowing therethrough. The reformed gas flow channel plates 330a, 330b, in the planes of which reformed gas flows, correspond to the first flow channel plates (the first flow channel members), and the purge gas flow channel plate 350, in the plane of which purge gas flows, corresponds to the second flow channel plate (the second flow channel member). Each of the hydrogen separation plates 340a, 340b is disposed in such a manner as to be interposed between a reformed gas flow channel plate and a purge gas flow channel plate. Each of the hydrogen separation plates 340a, 340b corresponds to the hydrogen separation member. The reformed gas flow channel plate and the purge gas flow channel plate are identical in shape but are oriented differently when being laminated.

The reformed gas flow channel plate 330a has a flow channel hole 334 constituting an in-plane flow channel together with the hydrogen separation plates 340a, 340b and longitudinal holes ; 332a–332d for ensuring flow of reformed gas and purge gas in the direction of lamination. The same holds true for the other flow channel plates.

The hydrogen separation plates 340a, 340b have the function of separating hydrogen from reformed gas. The hydrogen separation plate 340a has a hydrogen separation portion 344, which is hatched as shown in FIG. 16. Hydrogen contained in reformed gas flowing above the hydrogen separation plate 340a shown in FIG. 16 is separated in the hydrogen separation portion 344 and absorbed into purge gas flowing below the hydrogen separation plate 340a. The hydrogen separation plate 340a has longitudinal holes 342a–342d for ensuring flow of reformed gas and purge gas in the direction of lamination respectively. The other hydrogen separation plates including the hydrogen separation plate 340b are constructed in the same manner.

Each of the longitudinal holes 332 formed in the flow channel plate and a corresponding one of the longitudinal holes 342 formed in the hydrogen separation plate are positioned and shaped in such a manner as to substantially coincide with each other in a laminated state. In the laminated state, the longitudinal holes 332, 342 constitute the flow channels through which reformed gas and purge gas flow in the direction of lamination. As indicated by arrows in FIG. 16, while flowing in the direction of lamination, reformed gas and purge gas branch off and flow through each of the flow channel plates as well as in the in-plane direction. These gases are finally discharged from outlet ports of the other end plate, which is opposed to the end plate 320.

In this embodiment, the end plates, the reformed gas flow channels, the purge gas flow channel plates, and the hydrogen separation plates are bonded together by diffusion bonding. By adopting diffusion bonding, the step of bonding each of the plates can be made relatively simple. Heat resistance and corrosion resistance can be maintained among the plates easily and stably.

Each of the flow channel plates is bonded, almost over its entire surface shown in FIG. 16, to another plate. Each of the hydrogen separation plates is bonded, in its region except the hydrogen separation portion 344 shown in FIG. 16, to another plate. Each of these portions thus bonded to another plate will be referred to as a bonded portion irrespective of the type of a corresponding plate.

C. Detailed Structure of Hydrogen Separation Plates:

The hydrogen separation plates are constructed of base materials made of vanadium. It is also possible to use group five metals such as niobium and tantalum or alloys of those metals instead of using vanadium. The thickness of the hydrogen separation plates can be set suitably. However, in order to construct each of the hydrogen separation plates as a self-supported film capable of maintaining its shape to a certain extent as a single body, it is preferable that the thickness be set equal to or larger than 10 $\mu$m. On the other hand, if reducing the thickness to such an extent that sufficient perviousness to hydrogen can be ensured is taken into account, it is more preferable that the hydrogen separation plates be as thick as 20 to 40 $\mu$m. It is also appropriate that a reinforcing member having a thickness of about 100 $\mu$m be attached to the bonded portion of each of the hydrogen separation plates.

The surfaces of the base materials of the hydrogen separation portions are coated with a metal pervious to hydrogen, such as palladium or a palladium alloy. The coating process in this case can be performed, for example, by chemical vapor deposition (CVD), physical vapor deposition (PVD), or the like.

In general, group five metals or their alloys are much higher in perviousness to hydrogen than palladium or the like, but can be oxidized easily. Therefore, they tend to lose perviousness to hydrogen because of oxide layers. In this embodiment, the surfaces of the base materials are coated with palladium or the like, whereby it becomes possible to realize high perviousness to hydrogen while inhibiting oxide layers from being formed. Further, since the members exhibiting high perviousness to hydrogen are employed as the base materials, the hydrogen separation plates are guaranteed to have a certain thickness while sufficient perviousness to hydrogen is ensured. As a result, an advantage of increased rigidity can also be achieved.

Although the bonded portions of the hydrogen separation plates may be formed of the base materials, it is also appropriate that their surfaces be coated with a metal. For example, titanium, copper, aluminum, and the like can be selected as the metal. Titanium is especially desirable, because it is close in thermal expansion coefficient to group five metals or their alloys and can suppress thermal stress. By thus coating the bonded portions, these portions are advantageously prevented from being oxidized or subjected to hydrogen embrittlement.

D. Detailed Structure of Flow Channel Plates:

The flow channel plates are made of the same material as the hydrogen separation plates. In this embodiment, vanadium is used. By using the same material as the hydrogen separation plates, it becomes possible to perform diffusion bonding easily and stably. It is also possible to use stainless or the like.

As described above, the flow channel plates constitute the channels in the planes of which gas flows. The cross-sectional area of each of the flow channels depends on the thickness of a corresponding one of the flow plates. If a certain one of the flow channel plates is reduced in thickness, a corresponding one of the flow channels is reduced in cross-sectional area. Hence, the pressure loss during flow of gas is increased. On the other hand, if the flow channel plates are made thin, the hydrogen extraction unit can be made compact. The thickness of each of the flow channel plates can be set suitably in consideration of both surfaces of that flow channel plate. For example, the thickness of each of the flow channel plates can be set as 100 $\mu$m to 1 mm, and preferably as 200 to 500 $\mu$m.

Although the bonded portions of the flow channel plates may be formed of the base materials, it is also appropriate that their surfaces be coated with a metal such as titanium, copper, or aluminum, as in the case of the hydrogen separation plates. In this case as well, it is preferable that the flow channel plates be coated with the same material as the hydrogen separation plates.

E. Detailed Structure of End Plates:

The end plates are made from the same material as the hydrogen separation plates. In this embodiment, vanadium is used. By using the same material as the hydrogen separation plates, it becomes possible to perform diffusion bonding easily and stably. Aluminum is advantageous in that the unit can be made compact. To ensure sufficient rigidity, it is preferable that the end plates be as thick as about 1 mm.

Each of the end plates has a surface to be bonded to a corresponding one of the flow channel plates. Although this surface may be formed of the base material, it may also be coated with a metal such as titanium, copper, or aluminum. In this case as well, it is preferable that the end plates be coated with the same material as the flow channel plates.

The pipe lines designed as the inlet and outlet ports for reformed gas and purge gas are bonded to each of the end plates. These pipe lines can be made of stainless or the like and can be bonded to the end plates by various bonding methods such as brazing or welding.

In this embodiment, the end plates are made of vanadium in consideration of heat resistance, corrosion resistance, and ease with which the end plates are bonded to the flow channel plates. However, it is also appropriate that the end plates be made of the same material as the pipe lines, for example, of stainless or the like, in consideration of ease with which the end plates are bonded to the pipe lines. In this case as well, the end plates and the flow channel plates can be bonded together by diffusion bonding. However, from the standpoint of stabilization and ease with which bonding is performed, it is preferable to adopt brazing. It is also possible to adopt other bonding methods free from fusion of the base materials. In the case where the end plates are made of stainless, it is preferable that the flow channel plates or the like be coated with a metal that is intermediate in thermal expansion coefficient between stainless and group five metals or their alloys, such as palladium or titanium. Thus, the thermal stress between each of the end plates and a corresponding one of the flow channel plates can be weakened.

F. Method of Manufacturing Hydrogen Extraction Unit:

The hydrogen extraction unit 310 can be manufactured according to the following manufacturing steps. First of all, the plate members, namely, the end plates, the flow channel plates, and the hydrogen separation plates are prepared. The holes shown in FIG. 16 are formed in the plate members. For example, these holes can be formed by etching, electric discharge machining (e.g., wire cut), laser machining, press work, or the like. The hydrogen separation portion of each of the hydrogen separation plates is coated with palladium or its alloy.

The plate members are made of a material that can be oxidized easily, such as vanadium. Thus, it is desirable that the aforementioned process be performed in an environment that does not cause oxidation, for example, under the atmosphere of inactive gas. As described above, it is desirable that the bonded portions be coated with titanium or the like.

The plate members thus formed are oriented and laminated in the sequence shown in FIG. 16, heated, pressurized, and bonded together by diffusion bonding. In addition, the pipe lines designed as the inlet and outlet ports are connected to each of the end plates by brazing.

The hydrogen extraction unit 310 according to the aforementioned embodiment adopts a laminated structure of the thin plates, whereby it becomes possible to make the unit compact as a whole. Further, the perviousness can be enhanced by making use of the hydrogen separation portions effectively. In this embodiment, while the bonded portions remain uncoated, the hydrogen separation portions are coated with palladium or the like. Therefore, this embodiment is also advantageous that the amount of use of a noble metal can be reduced.

A group five metal or a group five metal alloy is used as the base material of the hydrogen separation plates, and the surfaces of the hydrogen separation plates are coated with palladium or the like. Therefore, while suppressing formation of oxide films and ensuring high perviousness to hydrogen, the hydrogen separation plates can be formed as self-supported films. By forming the hydrogen separation plates as self-supported films, it becomes possible to achieve the advantage of making the manufacture of the unit relatively easy. Further, both the flow channel plates and the hydrogen separation plates are made of group five metals or their alloys, whereby it becomes possible to ensure a uniform thermal expansion coefficient of the unit as a whole. The advantage of making it possible to weaken thermal stress is also achieved. This construction also makes it possible to reduce the areas of the hydrogen separation members to be coated. Accordingly, the consumption of palladium as a noble metal can be suppressed, and the manufacturing cost can be reduced. Furthermore, the laminated structure composed of the base materials that are highly pervious to hydrogen is adopted. Therefore, the advantage of making it possible to make the hydrogen separation members thick without causing a substantial loss in the perviousness to hydrogen and to enhance the rigidity of the hydrogen separation members is achieved as well.

According to the invention, it is preferable that the first and second flow channel members and the hydrogen separation members be bonded together by a bonding method free from fusion of the base materials. In the case where such a bonding method is adopted, there is no need to set the thickness of each of the members on the premise that they will melt. Thus, the unit can be made thinner as a whole. For example, brazing or diffusion bonding can be adopted as such a bonding method. However, diffusion bonding is more preferable from the standpoint of ensuring heat resistance and corrosion resistance.

According to the invention, while the flow channel can be formed together with the first or second flow channel member at each of the opposed ends of the laminated structure, the end plate in which the supply port for reformed gas and the extraction port for hydrogen are formed can be provided at each of the opposed ends of the laminated structure. The end plates and the flow channel members may be made of the same material or of different materials. If the end plates are made of the same material as the flow channel members, it is possible to bond each of the end plates to a corresponding one of the flow channel members easily and stably. In particular, great usefulness is achieved in the case where the end plates and the flow channel members are bonded together by diffusion bonding. If the end plates and the flow channel members are made of different materials, it is preferable that the end plates be made of the same material as the pipe lines connected to the supply port and the extraction port. For example, a stainless material can be used as such a material.

It is to be noted herein that the invention can be constructed in various manners not only as the aforementioned hydrogen extraction unit but also as the method of manufacturing the hydrogen extraction unit or the fuel cell system or the like equipped with the hydrogen extraction unit.

H. Modification Examples:

This embodiment adopts a construction in which reformed gas and purge gas flow crosswise as shown in FIG. 16. The shapes and positions of the flow channel holes and the longitudinal holes may be adjusted to realize counterflow of reformed gas and purge gas. By adopting this construction, it becomes possible to further enhance the efficiency of separating hydrogen.

Although this embodiment is an example in which reformed gas and purge gas flow through the in-plane flow channels in parallel, the flow channels can be constructed in various manners. For example, it is also appropriate that the flow channels be constructed such that reformed gas and purge gas flow in series. Such a construction can be realized easily, for example, by plugging up the longitudinal hole 342*c* or the like in FIG. 16.

The flow channels are not limited to the aforementioned exemplary ones but can be constructed in various manners. For example, as disclosed in Japanese Patent Application Laid-Open No. 6-345408, the invention may also be applied to a flow channel construction in which gases are supplied or discharged in a direction along surfaces of a laminated structure.

Although the invention has been described hereinbefore on the basis of the various embodiments thereof, it is quite obvious that the invention is not limited to the embodiments and can be constructed in various manners without departing from the spirit thereof.

What is claimed is:

1. A hydrogen extraction unit for extracting hydrogen from a hydrogen-containing gas that contains hydrogen, comprising:

a hydrogen separation member having a first and second face, the hydrogen separation member designed as a thin metal plate member that is equipped with a hydrogen separation film that selectively allows penetration of hydrogen;

a first flow channel member disposed in a laminated manner, designed as a thin metal plate member, disposed adjacent to the first face of the hydrogen separation member, so that the first channel member is bonded to the hydrogen separation member by a bonding method free from fusion of a base material, and constituting, together with the hydrogen separation member adjacent to the first flow channel member, a first hydrogen-containing gas flow channel and that extends laterally across the first face of the hydrogen separation member in a first direction through which the hydrogen-containing gas flows in the first direction; and a second flow channel member disposed in a laminated manner, designed as a thin metal plate member, disposed adjacent to the second face of the hydrogen separation member, so that the second flow channel member is bonded to the hydrogen separation member by a bonding method free from fusion of a base material, and constituting, together with the hydrogen separation member adjacent to the second flow channel member, a second hydrogen flow channel that extends laterally across the second face of the hydrogen separation member in a second direction and through which hydrogen penetrating the hydrogen separation film and extracted hydrogen gas flows in the second direction, the first direction being approximately perpendicular to the second direction.

2. The hydrogen extraction unit according to claim 1, wherein:

the bonding method free from fusion of the base material is at least one of diffusion bonding and brazing.

3. The hydrogen extraction unit according to claim 1, wherein:

the hydrogen separation member is a metal foil that selectively allows penetration of hydrogen.

4. The hydrogen extraction unit according to claim 1, wherein:

the hydrogen separation member is comprised of a base member designed as a porous body formed by a thin metal plate, and of a coat formed on opposed faces of the base member and selectively allowing penetration of hydrogen.

5. The hydrogen extraction unit according to claim 4, wherein:

the base member is made of a group five metal or a group five metal alloy.

6. The hydrogen extraction unit according to claim 4, wherein:

the coat is made of one of palladium, a palladium alloy, vanadium, niobium, and tantalum.

7. The hydrogen extraction unit according to claim 4, wherein:

the coat is formed in a region other than portions to be bonded to the first flow channel member and the second flow channel member.

8. The hydrogen extraction unit according to claim 1, wherein:

metals of which the first flow channel member and the second flow channel member are made are close in thermal expansion coefficient to the hydrogen separation member.

9. The hydrogen extraction unit according to claim 1, wherein:

the first flow channel member and the second flow channel member are made of a group five metal or a group five metal alloy.

10. The hydrogen extraction unit according to claim 1, wherein:

the first flow channel member and the second flow channel member are made of stainless steel.

11. The hydrogen extraction unit according to claim 1, wherein:

the first flow channel member has a first gas flow channel hole portion which constitutes the hydrogen-containing gas flow channel; and an inner wall surface of the hydrogen-containing gas flow channel is comprised of an inner face of the first gas flow channel hole portion of the first flow channel member, and of hydrogen separation films of two hydrogen separation film members between which opposed faces of the first flow channel member are sandwiched.

12. The hydrogen extraction unit according to claim 11, wherein:

the first gas flow channel hole portion is formed by at least one of etching, electric discharge machining, laser machining, and electrochemical machining.

13. The hydrogen extraction unit according to claim 1, wherein:

the second flow channel member has a second gas flow channel hole portion which constitutes the hydrogen flow channel, an inner wall surface of the hydrogen flow channel is comprised of an inner face of the second gas flow channel hole portion of the second flow channel member, and of hydrogen separation films of two hydrogen separation film members between which opposed faces of the second flow channel member are sandwiched.

14. The hydrogen extraction unit according to claim 13, wherein:

the second gas flow channel hole portion is formed by at least one of etching, electric discharge machining, laser machining, and electrochemical machining.

15. The hydrogen extraction unit according to claim 1, wherein:

the hydrogen separation member has first hole portions and second hole portions, the first hole portion communicates with the hydrogen-containing gas flow channel formed on the side of the first face of the hydrogen separation member, the second hole portion communicates with the hydrogen flow channel formed on the side of the second face of the hydrogen separation member, the first flow channel member constituting the hydrogen-containing gas flow channel together with the hydrogen separation member has a third hole portion formed at a position corresponding to the second hole portion of the hydrogen separation member adjacent to the first flow channel member, the second flow channel member constituting the hydrogen flow channel together with the hydrogen separation member has a fourth hole portion formed at a position corresponding to the first hole portion of the hydrogen separation member adjacent to the second flow channel member, the first hole portion of the hydrogen separation member and the fourth hole portion of the second flow channel member constitute, in the hydrogen extraction unit as a whole, a flow channel through which the hydrogen-containing gas is introduced in a direction of lamination of the flow channel member via the hydrogen-containing gas flow channel, and the second hole portion of the hydrogen separation member and the third hole portion of the first flow channel member constitute, in the hydrogen extraction unit as a whole, a flow channel through which the hydrogen is introduced in the direction of lamination of the flow channel member via the hydrogen flow channel.

16. The hydrogen extraction unit according to claim 15, wherein: the hydrogen-containing gas flow channel formed of the first flow channel member is constituted by a first gas flow channel hole portion almost extending from one end to the other opposed end of the first flow channel member, the hydrogen flow channel formed of the second flow channel member is constituted by the second gas flow channel hole portion almost extending from one end to the other opposed end of the second flow channel member, one end portion of the first gas flow channel hole portion communicates with the first hole portion formed in the hydrogen separation member adjacent to one face of the first flow channel member, the other end portion of the first gas flow channel hole portion communicates with the first hole portion formed in the hydrogen separation member adjacent to the other face of the first flow channel member, one end portion of the second gas flow channel hole portion communicates with the second hole portion formed in the hydrogen separation member adjacent to one face of the second flow channel member, and the other end portion of the second gas flow channel hole portion communicates with the second hole portion formed in the hydrogen separation member adjacent to the other face of the second flow channel member.

17. The hydrogen extraction unit according to claim 1, wherein:

the hydrogen flow channel is supplied with a purge gas having a lower concentration of hydrogen than the hydrogen-containing gas.

18. The hydrogen extraction unit according to claim 17, wherein:

the purge gas is one of water vapor, anode off gas, cathode off gas and a gas obtained by removing carbon monoxide from the remaining reformed gas.

19. The hydrogen extraction unit according to claim 1, wherein:

a plurality of first and second flow channel members and hydrogen separation members are laminated in sequence such that the first flow channel members are oriented to allow the hydrogen containing gas to flow in an opposite direction in relation to the next adjacent first flow channel member; and the second flow channel members are oriented to allow the extracted hydrogen gas to flow in an opposite direction in relation to the next adjacent second flow channel member.

20. A fuel cell system comprising:

a hydrogen extraction unit; and a fuel cell that obtains an electromotive force by using hydrogen extracted from the hydrogen extraction unit in an electrochemical reaction, wherein:

the hydrogen extraction unit is equipped with:

a hydrogen separation member designed as a thin metal plate member that is equipped with a hydrogen separation film that selectively allows penetration of hydrogen, the hydrogen separation member having a first face and an opposing second face;

a first flow channel member disposed in a laminated manner, designed as a thin metal plate member, disposed adjacent to the first face of the hydrogen separation member, bonded to the hydrogen separation member by a bonding method free from fusion of a base material, and constituting, together with the hydrogen separation member adjacent to the first flow channel member, a hydrogen-containing gas flow channel and through which the hydrogen-containing gas flows laterally across the first face of the hydrogen separation member in a first direction; and a second flow channel member disposed in a laminated manner, designed as a thin metal plate member, disposed adjacent to the second face of the hydrogen separation member, bonded to the hydrogen separation member by a bonding method free from fusion of a base material, and constituting, together with the hydrogen separation member adjacent to the second flow channel member, a hydrogen flow channel through which hydrogen penetrating the hydrogen separation film and extracted from the hydrogen-containing gas flows laterally across the second face of the hydrogen separation member in a second direction, the second direction being substantially perpendicular to the first direction.

21. The fuel cell system according to claim 20, further comprising:

a desulfurizer that desulfurize reformed fuel.

22. The fuel cell system according to claims 20, further comprising:

a carbon monoxide reduction unit that reduces the amount of carbon monoxide contained in reformed gas.

23. A hydrogen extraction unit for extracting hydrogen from a hydrogen-containing gas that contains hydrogen, comprising:

a hydrogen separation member having a first face and an opposing second face, the hydrogen separation member designed as a thin plate having a coat made from one of palladium and a palladium alloy on opposed first and second faces that selectively allows penetration of hydrogen and that is made of a group five metal or a group five metal alloy;

a first flow channel member designed as a thin plate member, disposed adjacent to the first face of the hydrogen separation member, and constituting, together with the hydrogen separation member adjacent to the first flow channel member, a hydrogen-containing gas flow channel through which the hydrogen-containing gas flows laterally across the first face of the hydrogen separation member in a first direction; and a second flow channel member designed as a thin plate member, disposed adjacent to the second face of the hydrogen separation member, and constituting, together with the hydrogen separation member adjacent to the second flow channel member, a hydrogen flow channel through which hydrogen penetrating the hydrogen separation film and extracted from the hydrogen-containing gas flows laterally across the second face of the hydrogen separation member in a second direction, the first direction being approximately perpendicular to the second direction;

wherein the hydrogen separation member, the first flow channel member, and the second flow channel member are constructed in a laminated manner.

24. The hydrogen extraction unit according to claim 23, wherein:
the first flow channel member and the second flow channel member are made of a group five metal or a group five metal alloy, and
the hydrogen separation member is coated except its portions which are to be bonded to the first flow channel member and the second flow channel member.

25. The hydrogen extraction unit according to claim 23, wherein:
those portions of the hydrogen separation member which are to be bonded to the first flow channel member and the second flow channel member are coated with a metal that suppresses oxidation or hydrogen embrittlement.

26. The hydrogen extraction unit according to claim 25, wherein:
the metal coat is made of at least one of titanium, copper, and aluminum.

27. The hydrogen extraction unit according to claim 23, wherein:
the first flow channel member and the second flow channel member and the hydrogen separation member are bonded together by diffusion bonding.

28. A hydrogen extraction unit for extracting hydrogen from a hydrogen containing gas that contains hydrogen, comprising:
a plurality of hydrogen separation plates, first flow channel plates and second flow channel plates;
each hydrogen separation plate having a top surface and a bottom surface, and being permeable to hydrogen gas;
each first flow channel plate having a top surface and a bottom surface, the bottom surface of the first flow channel plate being adjacent the top surface of the hydrogen separation plate and when bonded together defining a first flow channel in a first direction, the first flow channel having a first flow inlet at one end and a first flow outlet at an opposing end;
each second flow channel plate having a top surface and a bottom surface, the top surface of the second flow channel plate being adjacent the bottom surface of the hydrogen separation plate and when bonded together defining a second flow channel in a second direction, the second flow channel having a second flow inlet at one end and a second flow outlet at an opposing end; and
when the plurality of plates are stacked together the top surface of the first flow channel plate is adjacent and bonded together with the bottom surface of the next hydrogen separation-plate above it and the bottom surface of the second flow channel plate is bonded with the top surface of the next hydrogen separation plate below it, the plurality of plates defining a first channel inlet side exposing the first flow channel inlet for the entrance of reforming gas, a second channel inlet side exposing the second flow channel inlet for the entrance of purged gas, a first channel outlet side exposing the first flow channel outlet for the transfer of exhaust gas and a second channel outlet side exposing the second flow channel outlet for the transfer of enriched gas.

29. A method of manufacturing a hydrogen extraction unit for extracting hydrogen from a hydrogen-containing gas that contains hydrogen, comprising the steps of:
(a) preparing a hydrogen separation member having a first and second face, the hydrogen separation member designed as a thin metal plate member equipped with a hydrogen separation film that selectively allows penetration of hydrogen;
(b) preparing a first flow channel member designed as a thin metal plate member and equipped with a first flow channel portion for constituting a first gas flow channel that extends in a first direction between the first flow channel member and the first face of the hydrogen separation member that is adjacent to the first flow channel member when the hydrogen extraction unit has been assembled;
(c) preparing a second flow channel member designed as a thin metal plate member and equipped with a second flow channel portion for constituting a second gas flow channel that extends in a second direction between the second flow channel member and the second face of the hydrogen separation member that is adjacent to the second flow channel member when the hydrogen extraction unit has been assembled.
(d) laminating a plurality of members including the hydrogen separation member the first flow channel member, and the second flow member in a predetermined sequence; and
(e) bonding the hydrogen separation member and the first and second flow channel member together by a bonding method free from fusion of a base material so that the first direction is substantially perpendicular to the second direction.

30. The method according to claim 29, wherein:
the bonding method free from fusion of the base material is diffusion bonding or brazing.

31. The method according to claim 29, wherein:
the steps (b) and (c) includes steps of forming the first and second flow channel portions by at least one of etching, electric discharge machining, laser machining, and electrochemical machining.

32. The hydrogen extraction unit according to claim 29, wherein:
those portions of the hydrogen separation member which are to be bonded to the first and second flow channel members are coated with a metal that suppresses at least one of oxidation and hydrogen embrittlement.

33. The hydrogen extraction unit according to claim 32, wherein:
the portions to be bonded are coated with the metal that is selected from titanium, copper, and aluminum.

* * * * *